(12) United States Patent
Yokoyama

(10) Patent No.: US 7,480,102 B2
(45) Date of Patent: Jan. 20, 2009

(54) ZOOM LENS AND OPTICAL APPARATUS HAVING THE SAME

(75) Inventor: Takayoshi Yokoyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 11/668,072

(22) Filed: Jan. 29, 2007

(65) Prior Publication Data

US 2007/0201147 A1 Aug. 30, 2007

(30) Foreign Application Priority Data

Feb. 28, 2006 (JP) .............................. 2006-052801
Jan. 15, 2007 (JP) .............................. 2007-005579

(51) Int. Cl.
G02B 15/14 (2006.01)
(52) U.S. Cl. ....................... 359/676; 359/680
(58) Field of Classification Search ................. 359/676, 359/680–706
See application file for complete search history.

(56) References Cited

U.S. PATENT DOCUMENTS

| 5,132,848 | A | 7/1992 | Nishio et al. | |
| 5,638,215 | A | 6/1997 | Neil | |
| 5,731,907 | A | 3/1998 | Sigler | |
| 6,594,087 | B2 | 7/2003 | Uzawa et al. | |
| 7,304,805 | B2 * | 12/2007 | Endo et al. | 359/690 |
| 7,315,424 | B2 * | 1/2008 | Saruwatari et al. | 359/687 |
| 2002/0075570 | A1 * | 6/2002 | Yamakawa | 359/684 |
| 2005/0270661 | A1 * | 12/2005 | Nanba et al. | 359/676 |
| 2007/0002462 | A1 * | 1/2007 | Mitsuki | 359/689 |

\* cited by examiner

*Primary Examiner*—Darryl J Collins
(74) *Attorney, Agent, or Firm*—Canon U.S.A., Inc. I.P. Division

(57) ABSTRACT

At least one exemplary embodiment is directed to a zoom lens including a plurality of lens units, in which an interval between respective adjacent lens units varies during zooming, an aperture stop, and a refractive optical element made of a solid material having an Abbe number (νd) and a relative partial dispersion (θgF) satisfying the following condition:

$\theta gF - (-1.665 \times 10^{-7} \cdot \nu d^3 + 5.213 \times 10^{-5} \cdot \nu d^2 - 5.656 \times 10^{-3} \cdot \nu d + 0.755) > 0.$ The refractive optical element is located at a position in which distances (dw, dt) from the aperture stop to the refractive optical element on an optical axis at a wide-angle end and a telephoto end, respectively, satisfy the following condition:

$dt/dw > 1.1.$

21 Claims, 28 Drawing Sheets

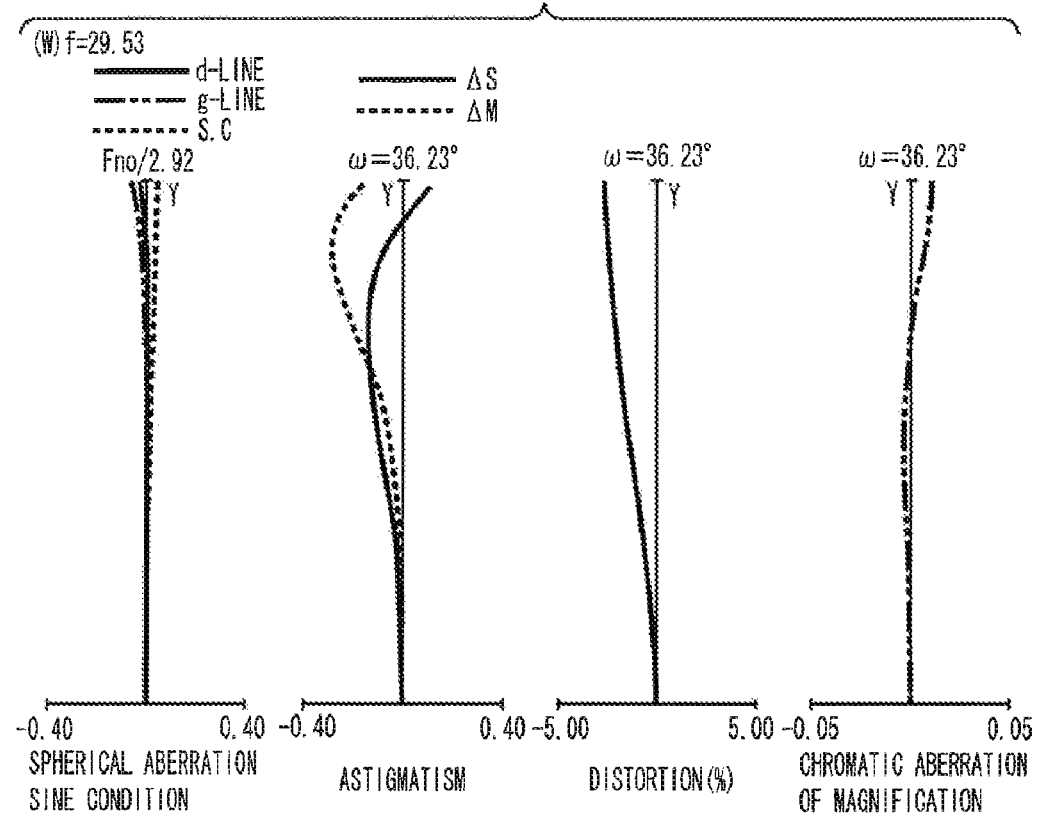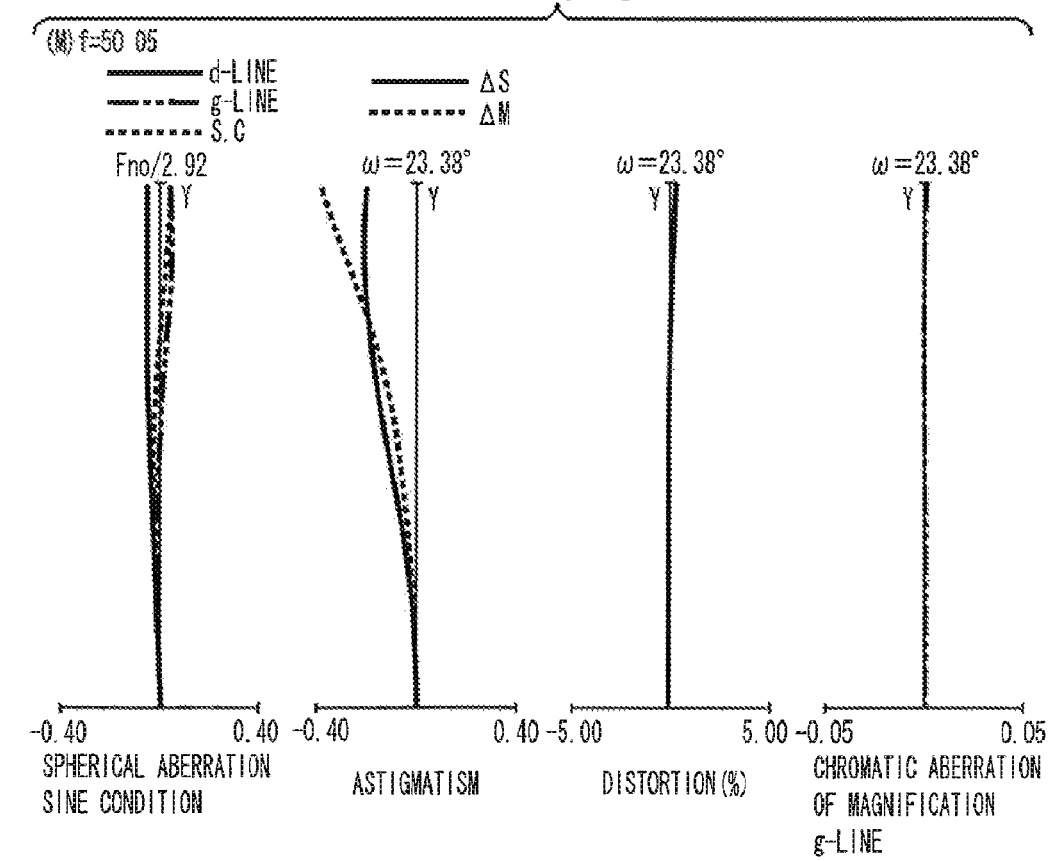

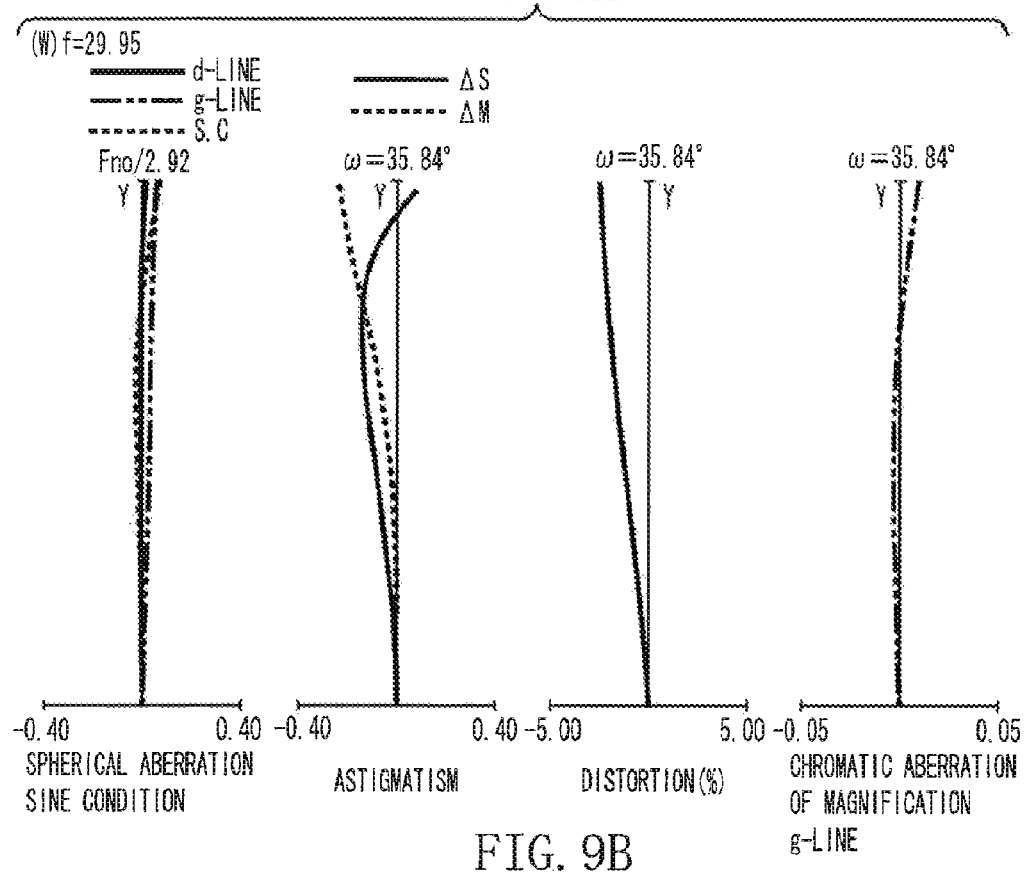
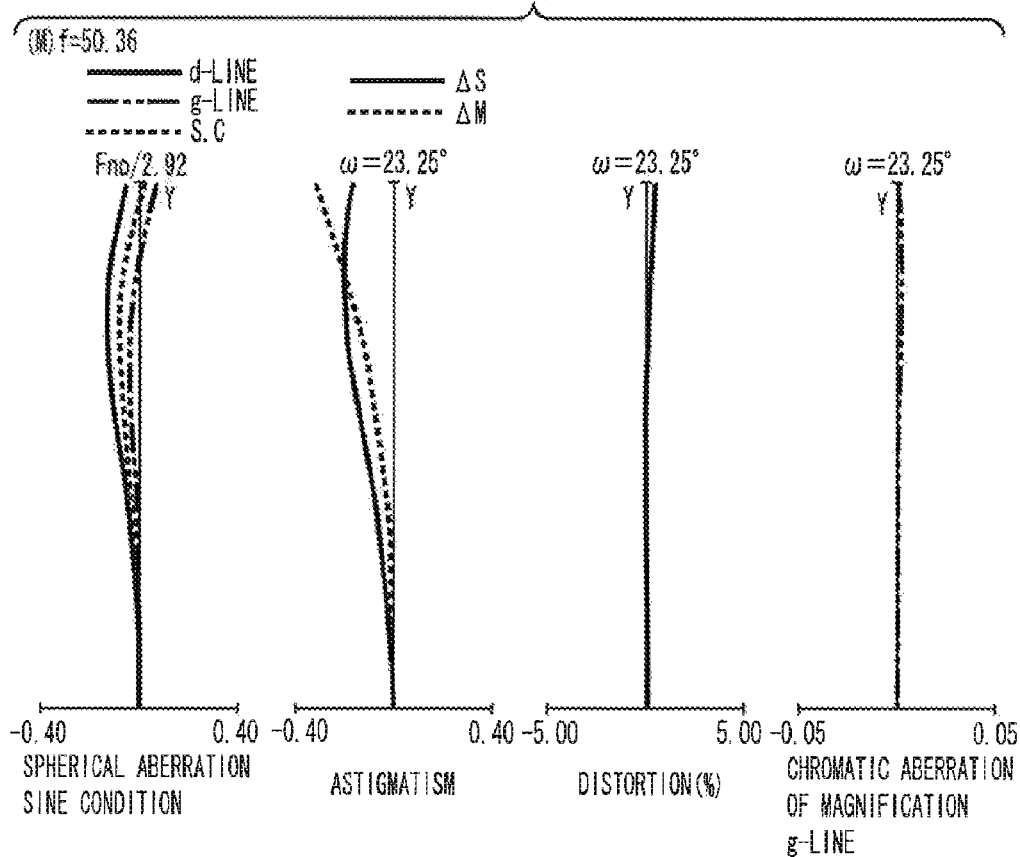

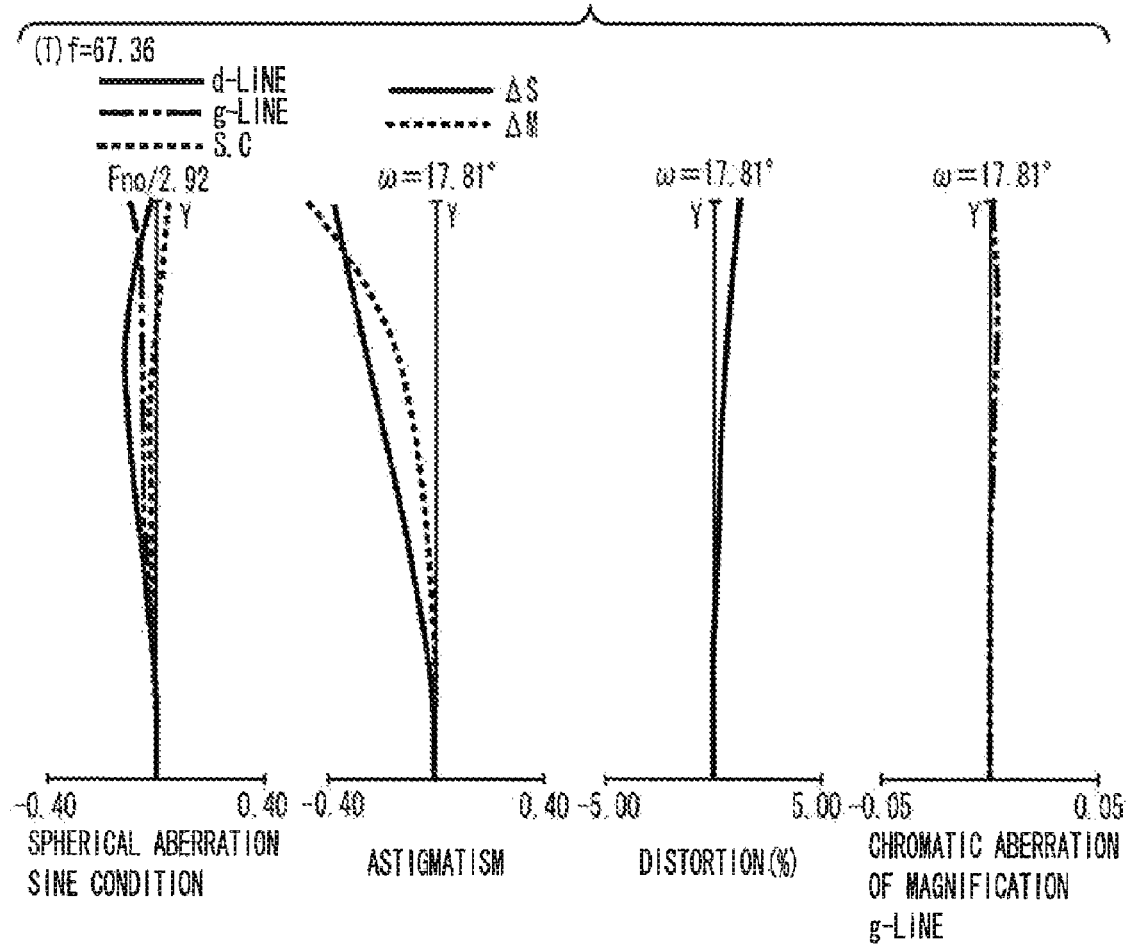

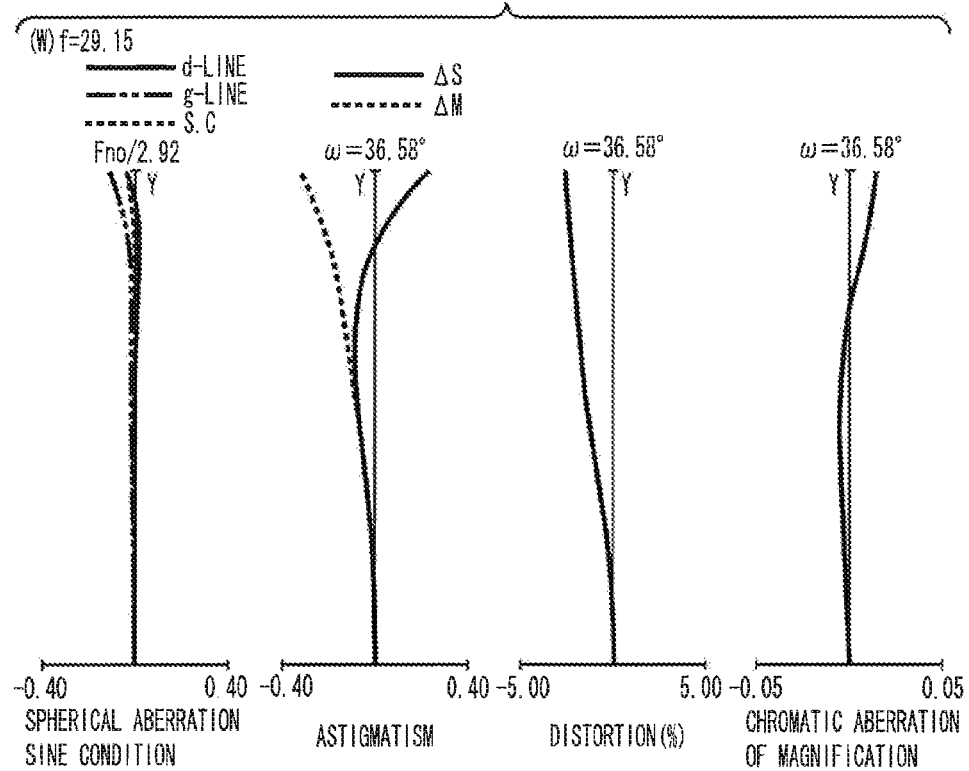
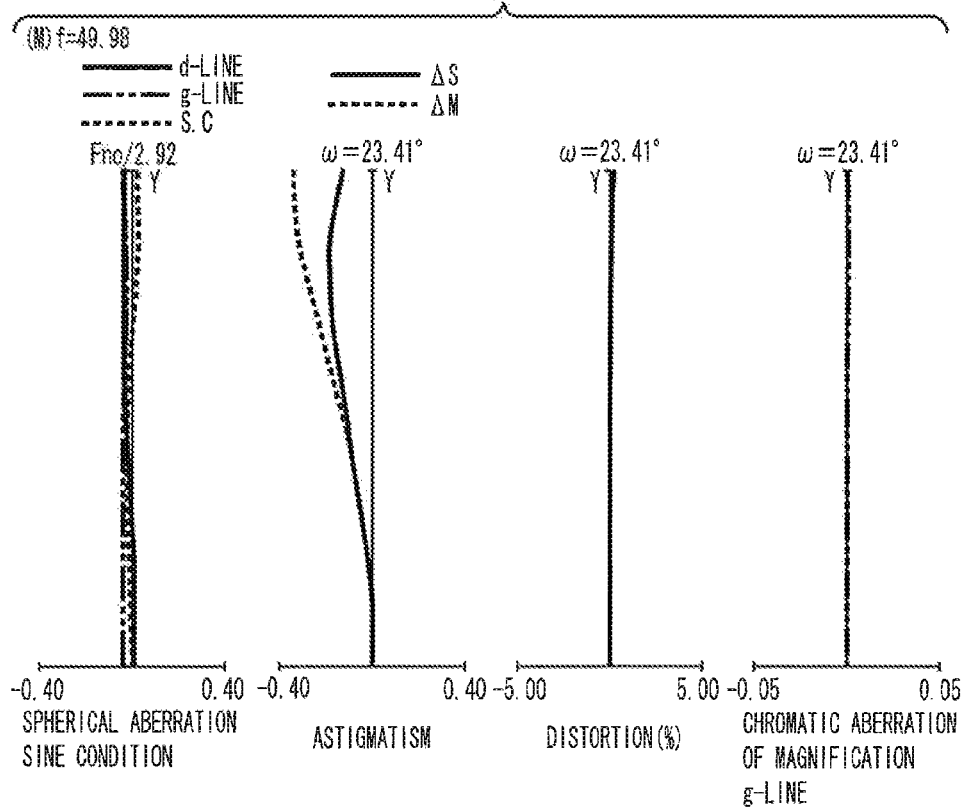

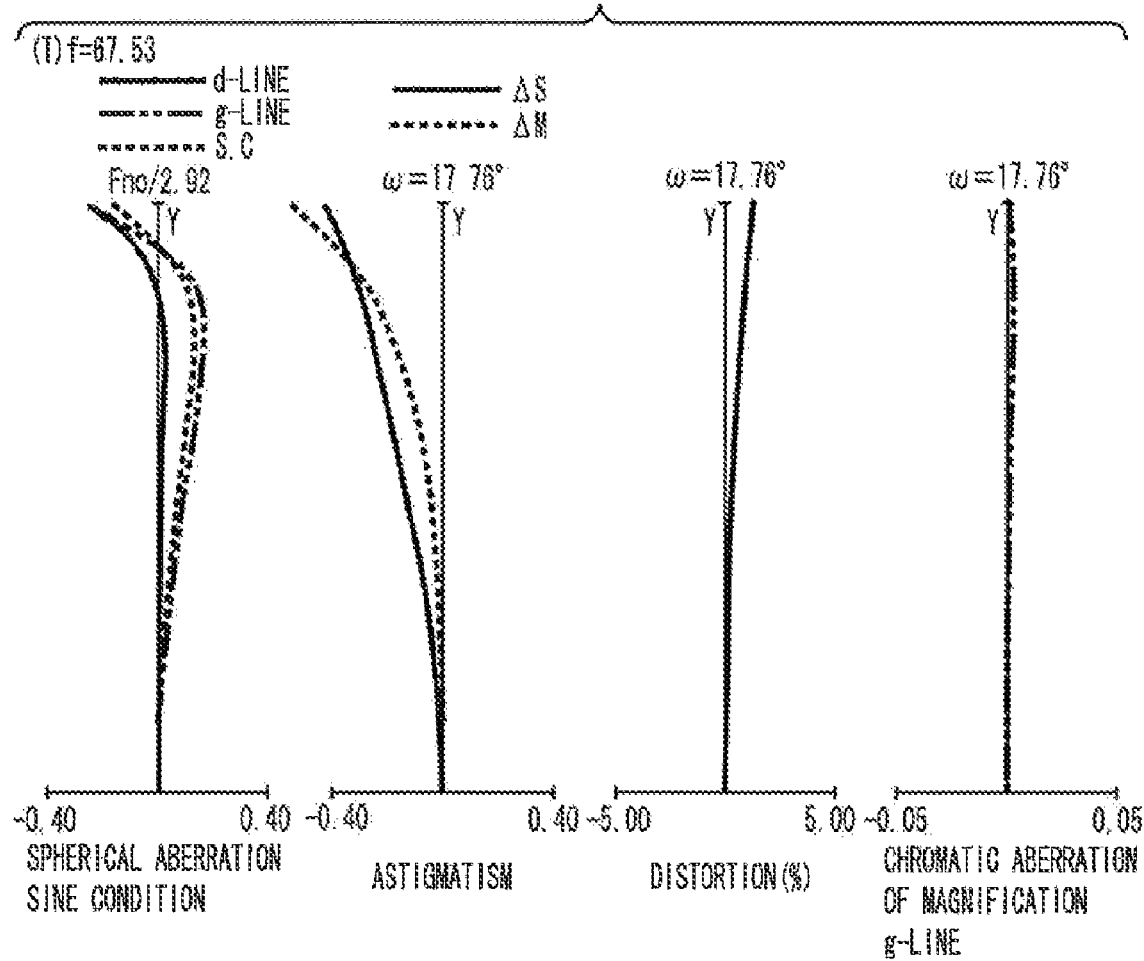

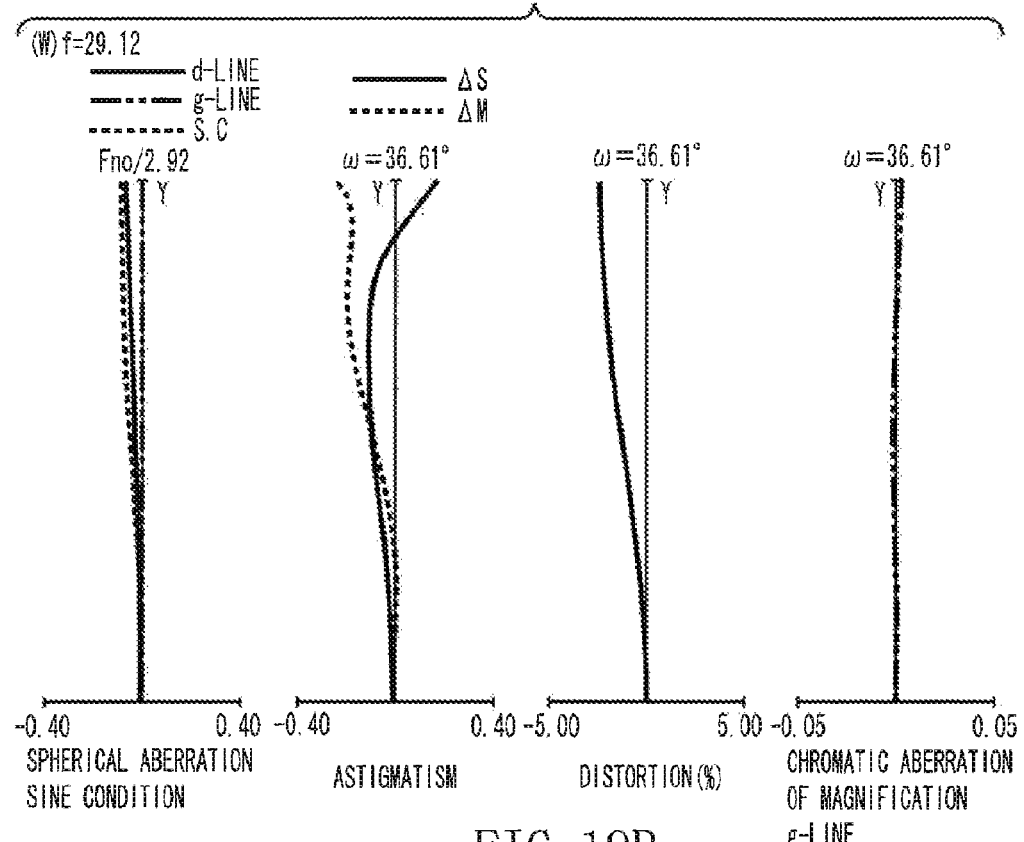
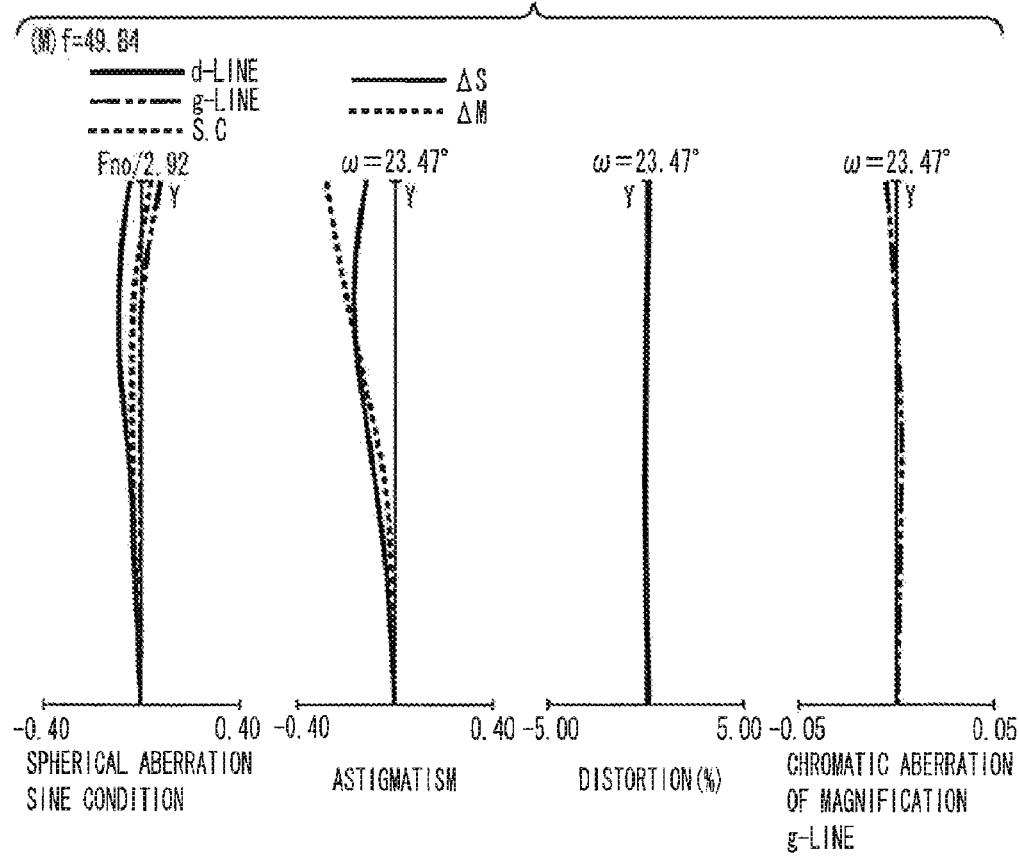

ZOOM LENS AND OPTICAL APPARATUS HAVING THE SAME

BACKGROUND OF THE INVENTION

1. Field of the Invention

The present invention relates to a zoom lens and an optical apparatus having the zoom lens, and more particularly, though not exclusively, a zoom lens that can be used in an optical apparatus such as a silver-halide film camera, a digital still camera, a video camera, a telescope, a binocular, a liquid crystal projector, and a copying machine.

2. Description of the Related Art

Recently, image sensors having a large number of pixels are used in image pickup apparatuses such as digital cameras.

With respect to photographic lenses that are used in such image pickup apparatuses to form an image, the market has desired zoom lenses having a high zoom ratio.

In addition, with respect to photographic lenses used in such image pickup apparatuses, the market has desired zoom lenses in which chromatic aberration, which affects a degree of color blurring and a degree of resolution in a white light source condition, is corrected, and in which spherical aberration and coma, which are related to monochromatic imaging performance, are corrected, as well.

With regard to a method of reducing chromatic aberration, U.S. Pat. No. 5,132,848 and U.S. Pat. No. 6,594,087 each discuss an optical system that uses an extraordinary partial dispersion material as an optical material. In addition, U.S. Pat. No. 5,731,907 and U.S. Pat. No. 5,638,215 each discuss an achromatic optical system that uses a liquid crystal material having relatively high dispersion and extraordinary partial dispersion characteristics.

In order to implement a zoom lens that has a high performance, a high field angle, and a high zoom ratio, it is useful to optimally set a lens configuration.

Generally, when a refractive power of each lens unit in a zoom lens is increased, the amount of movement of each lens unit during zooming can be reduced. Accordingly, the entire length of the zoom lens can be readily shortened.

However, if the refractive power of each lens unit is simply increased, the amount of aberration variation occurring during zooming becomes large. In particular, as a zoom lens has a higher zoom ratio, chromatic aberration of magnification varies in a larger amount.

For example, in a negative lead type optical system, chromatic aberration of magnification with respect to g-line light occurs in an over-corrected direction at the wide-angle end and in an under-corrected direction at the telephoto end. As a result, color blurring occurs in a peripheral portion of an image plane, thus deteriorating an image quality.

In a method of reducing chromatic aberration with an extraordinary partial dispersion material such as a fluorite arranged in an optical path, unless the extraordinary partial dispersion material is provided with an appropriate refractive power and arranged at an appropriate position, chromatic aberration can increase at either one of the wide-angle end and the telephoto end, while chromatic aberration can be corrected at the other.

In addition, the material discussed in U.S. Pat. No. 5,731,907 and U.S. Pat. No. 5,638,215 is a liquid material. Accordingly, the characteristics such as refractive index and dispersion characteristics considerably vary due to variation in temperature. Thus, such a material does not have useful environment resistance.

SUMMARY OF THE INVENTION

At least one exemplary embodiment is directed to a zoom lens that can be used in an optical apparatus (e.g., a silver-halide film camera, a digital still camera, a video camera, a telescope, a binocular, a liquid crystal projector, a copying machine, and other optical apparatuses as known by one of ordinary skill in the relevant arts).

According to an aspect of at least one exemplary embodiment of the present invention, a zoom lens includes a plurality of lens units, in which an interval between respective adjacent lens units varies during zooming, an aperture stop, and a refractive optical element made of a solid material having an Abbe number (νd) and a relative partial dispersion (θgF) satisfying the following condition:

$$\theta gF-(-1.665\times10^{-7}\cdot\nu d^3+5.213\times10^{-5}\cdot\nu d^2-5.656\times 10^{-3}\cdot\nu d+0.755)>0,$$

where the refractive optical element is located at a position in which distances (dw, dt) from the aperture stop to the refractive optical element on an optical axis at a wide-angle end and a telephoto end, respectively, satisfy the following condition:

$dt/dw>1.1$, or $dw/dt>1.1$.

According to another aspect of at least one exemplary embodiment of the present invention, a zoom lens includes a lens unit having a negative refractive power, a lens unit having a positive refractive power located behind (i.e., in the image direction from) the lens unit having a negative refractive power, in which zooming is performed by moving at least one of the two lens units along an optical axis, an aperture stop, and a refractive optical element made of a solid material having an Abbe number (νd) and a relative partial dispersion (θgF) satisfying the following condition:

$$\theta gF-(-1.665\times10^{-7}\cdot\nu d^3+5.213\times10^{-5}\cdot\nu d^2-5.656\times 10^{-3}\cdot\nu d+0.700)<0,$$

where the refractive optical element is located at a position in which distances (dw, dt) from the aperture stop to the refractive optical element on the optical axis at a wide-angle end and a telephoto end, respectively, satisfy the following condition:

$dt/dw>1.1$, or $dw/dt>1.1$.

According to an exemplary embodiment of the present invention, a zoom lens that has useful environment resistance and high optical performance can be implemented.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate some exemplary embodiments and features of the invention and, together with the description, serve to explain some of the principles of the invention.

FIGS. 7A through 7C are aberration charts of the zoom lens according to the numerical example 1 of the present invention.

FIGS. 9A through 9C are aberration charts of the zoom lens according to the numerical example 2 of the present invention.

FIGS. 11A through 11C are aberration charts of the zoom lens according to the numerical example 3 of the present invention.

FIGS. 13A through 13C are aberration charts of the zoom lens according to the numerical example 4 of the present invention.

FIGS. 19A through 19C are aberration charts of the zoom lens according to the numerical example 7 of the present invention.

DETAILED DESCRIPTION OF THE EMBODIMENTS

Figure 1:
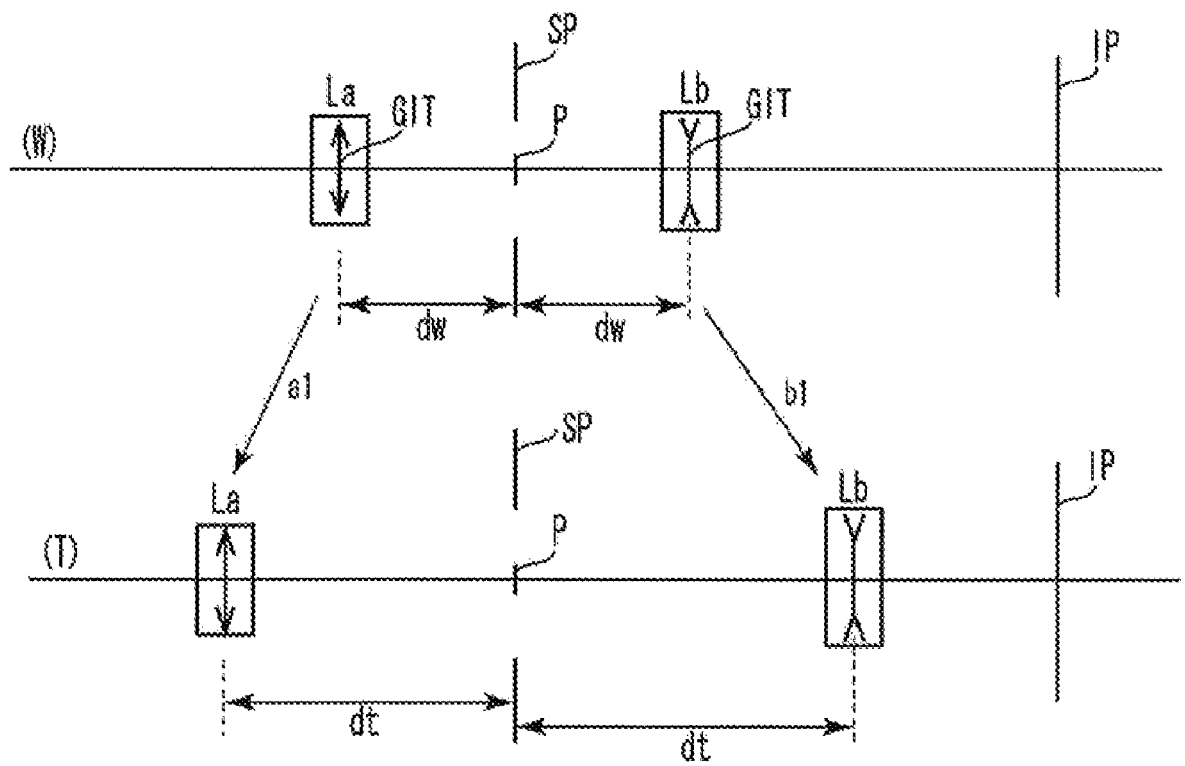
FIG. 1 illustrates a paraxial refractive power arrangement of a zoom lens according to a first exemplary embodiment of the present invention.

Various exemplary embodiments, features, and aspects of the invention will be described in detail below with reference to the drawings. It should be noted that the relative arrangement of the components, the numerical expressions and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

First Exemplary Embodiment

Figure 2:
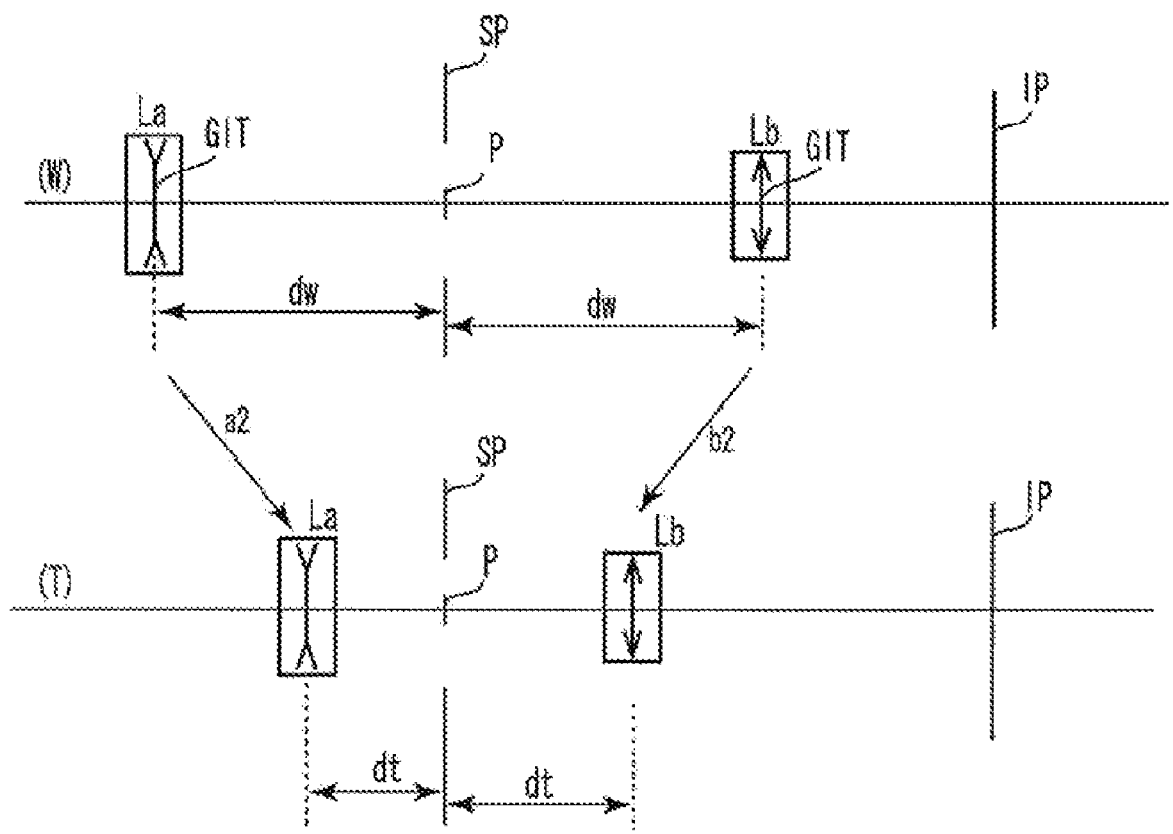
FIG. 2 illustrates a paraxial refractive power arrangement of a zoom lens according to the first exemplary embodiment of the present invention.

FIG. 1 and FIG. 2 each illustrate a paraxial refractive power arrangement of a zoom lens according to a first exemplary embodiment of the present invention. Referring to FIGS. 1 and 2, "(W)" denotes a paraxial refractive power arrangement at a wide-angle end (a short focal length end) and "(T)" denotes a paraxial refractive power arrangement at a telephoto end (a long focal length end).

In FIGS. 1 and 2, a front side (a magnification conjugate side) is shown in a left-hand portion of each drawing, and a rear side (a reduction conjugate side) is shown in a right-hand portion of each drawing. This positional relationship is the same as in other exemplary embodiments of the present invention. Note that the front side is equivalent to an object side in a shooting optical system such as a camera, and is equivalent to a projection image side (screen side) in a projection optical system such as a liquid crystal projector. In addition, note that the rear side is equivalent to an image side in a shooting optical system such as a camera, and is equivalent to an original image side (liquid crystal panel side) in a projection optical system such as a liquid crystal projector.

"La" and "Lb" each denote a lens unit. "SP" denotes an aperture stop, and "IP" denotes a reduction side conjugate surface (an image side in the case of a shooting optical system). Only two lens units La and Lb are shown in FIG. 1 and FIG. 2. However, a zoom lens according to an exemplary embodiment can further include another lens unit or other lens units in addition.

Arrows (i.e., a1-a2 and b1-b2) each indicate a moving locus of each lens unit during zooming from the wide-angle end to the telephoto end. The aperture stop SP can be either stationary or movable during zooming.

The zoom lens according to the present exemplary embodiment includes a plurality of lens units and an aperture stop SP. In addition, in the zoom lens according to the present exemplary embodiment, at least one of the plurality of lens units moves along an optical axis during zooming, so that an interval between respective adjacent lens units varies.

The zoom lens shown in FIG. 1 and FIG. 2 includes at least one refractive optical element GIT made of a solid material having an Abbe number (νd) and a relative partial dispersion (θgF) satisfying the following condition:

$$\theta gF-(-1.665\times 10^{-7}\cdot vd^3+5.213\times 10^{-5}\cdot vd^2-5.656\times 10^{-3}\cdot vd+0.755)>0 \quad (1).$$

FIG. 1 illustrates an example in which the refractive optical element GIT is located at a position on the optical axis, on either side of SP, that satisfies the following condition:

$$dt/dw>1.1 \quad (2),$$

between conditions at the wide angle (W) and telephoto (T) ends, and FIG. 2 illustrates an example in which the refractive optical element GIT is located at a position on the optical axis, on either side of SP, that satisfies the following condition:

$$dw/dt > 1.1 \qquad (3)$$

between conditions at the wide angle (w) and telephoto (T) ends, where "dw" and "dt" denote distances from the aperture stop SP to the refractive optical element GIT on the optical axis at the wide-angle end and the telephoto end, respectively.

Note that in the examples shown in FIG. 1 and FIG. 2, both lens units La and Lb have a refractive optical element GIT. However, in the present exemplary embodiment, the zoom lens can include at least one refractive optical element GIT. This configuration applies to other exemplary embodiments of the present invention.

In the first exemplary embodiment, when the refractive optical element GIT (e.g., lens unit La) is located in front of (i.e., in the object direction from) the aperture stop SP (a point of intersection P between the optical axis and a paraxial chief ray) and is located at a position that satisfies the conditional expression (2) above, the refractive power of the refractive optical element GIT is positive. In addition, when the refractive optical element GIT (e.g., lens unit Lb) is located behind (i.e., in the image direction from) the aperture stop SP and is located at a position that satisfies the conditional expression (2) above, the refractive power of the refractive optical element GIT is negative.

On the other hand, when the refractive optical element GIT is located in front of (i.e., in the object direction from) the aperture stop SP (a point of intersection P between the optical axis and a paraxial chief ray) and is located at a position that satisfies the conditional expression (3) above, the refractive power of the refractive optical element GIT is negative. In addition, when the refractive optical element GIT is located behind (i.e., in the image direction from) the aperture stop SP and is located at a position that satisfies the conditional expression (3) above, the refractive power of the refractive optical element GIT is positive.

Furthermore, in the first exemplary embodiment, a relative partial dispersion $\theta gd$ of the solid material of the refractive optical element GIT satisfies the following condition:

$$\theta gd - (-1.687 \times 10^{-7} \cdot vd^3 + 5.702 \times 10^{-5} \cdot vd^2 - 6.603 \times 10^{-3} \cdot vd + 1.500) > 0 \qquad (4).$$

Moreover, in the first exemplary embodiment, the Abbe number vd of the solid material satisfies the following condition:

$$vd < 60 \qquad (5).$$

Second Exemplary Embodiment

Figure 3:
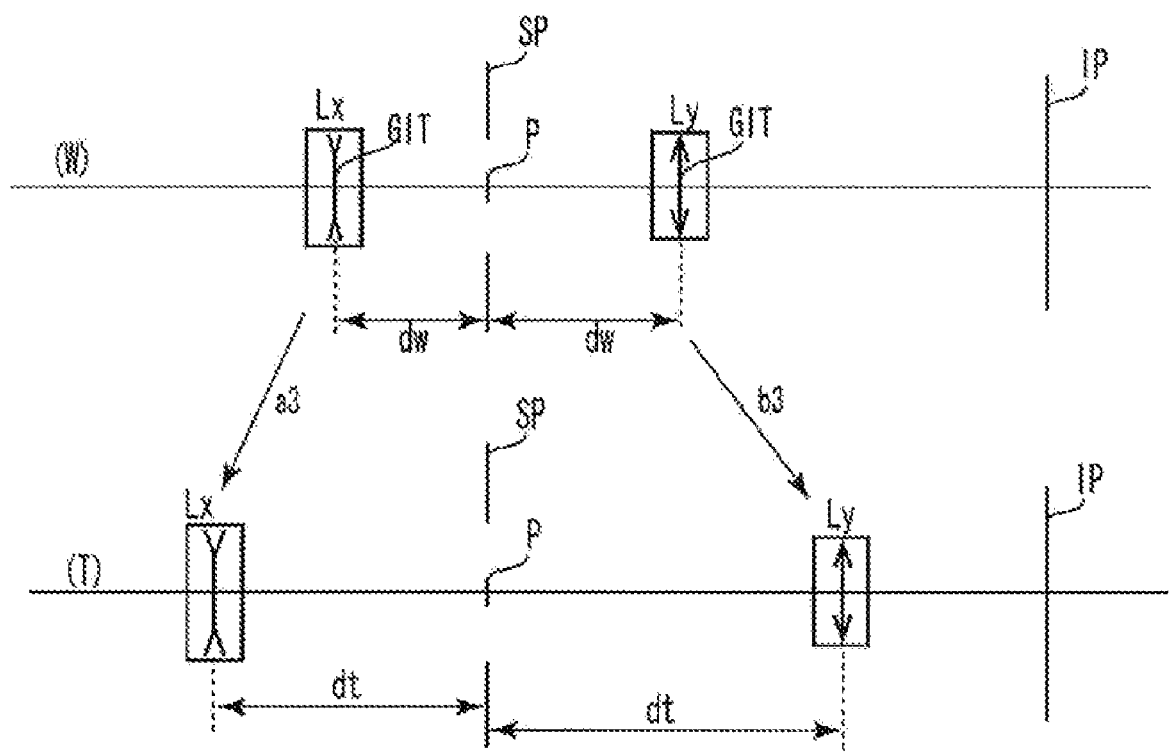
FIG. 3 illustrates a paraxial refractive power arrangement of a zoom lens according to a second exemplary embodiment of the present invention.
Figure 4:
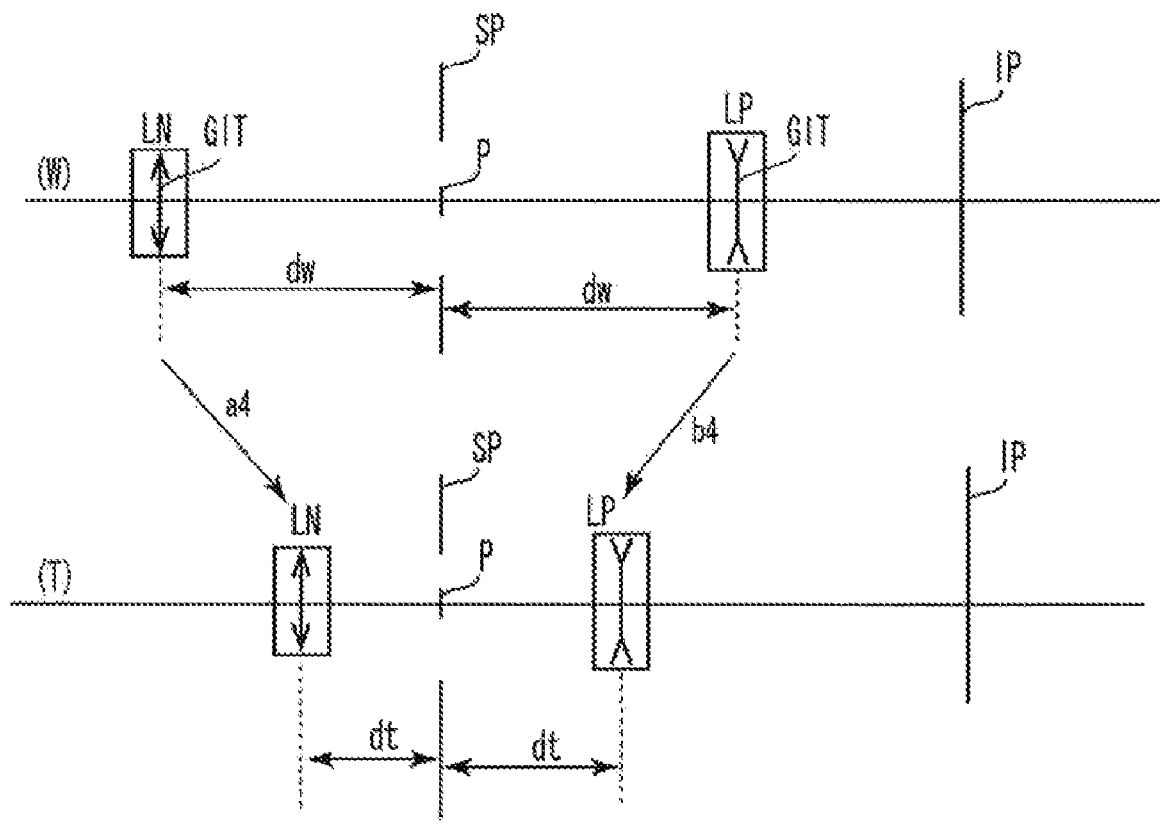
FIG. 4 illustrates a paraxial refractive power arrangement of a zoom lens according to the second exemplary embodiment of the present invention.

FIG. 3 and FIG. 4 each illustrate a paraxial refractive power arrangement of a zoom lens according to a second exemplary embodiment of the present invention. Referring to FIGS. 3 and 4, "(W)" denotes a paraxial refractive power arrangement at a wide-angle end and "(T)" denotes a paraxial refractive power arrangement at a telephoto end.

The zoom lens according to the second exemplary embodiment includes a plurality of lens units. Note that FIG. 3 and FIG. 4 each show an example in which the zoom lens includes only two lens units for easier understanding. However, the zoom lens can include another lens unit or other lens units in addition.

"Lx" and "Ly" each denote a lens unit. "SP" denotes an aperture stop, and "IP" denotes a reduction side conjugate surface (an image side in the case of a shooting optical system). Only two lens units Lx and Ly are shown in FIG. 3 and FIG. 4. However, a zoom lens according to an exemplary embodiment can further include another lens unit or other lens units in addition.

Arrows (i.e., a3-a4 and b3-b4) each indicate a moving locus of each lens unit during zooming from a zooming position at the wide-angle end to a zooming position at the telephoto end. Note that the aperture stop SP can be either stationary or movable during zooming.

The zoom lens according to the present exemplary embodiment includes a lens unit Lx and a lens unit Ly located behind the lens unit Lx. In addition, in the zoom lens according to the present exemplary embodiment, at least one of the lens units Lx and Ly moves along an optical axis during zooming, so that an interval between respective adjacent lens units varies.

The zoom lens shown in FIG. 3 and FIG. 4 includes at least one refractive optical element GIT made of a solid material having an Abbe number (vd) and a relative partial dispersion ($\theta gF$) satisfying the following condition:

$$\theta gF - (-1.665 \times 10^{-7} \cdot vd^3 + 5.213 \times 10^{-5} \cdot vd^2 - 5.656 \times 10^{-3} \cdot vd + 0.700) < 0 \qquad (6).$$

FIG. 3 illustrates an example in which the refractive optical element GIT is located at a position that satisfies the conditional expression (2) on the optical axis. FIG. 4 illustrates an example in which the refractive optical element GIT is located at a position that satisfies the conditional expression (3) on the optical axis.

In the second exemplary embodiment, when the refractive optical element GIT (e.g., lens unit Lx) is located in front of the aperture stop SP (a point of intersection P between the optical axis and a paraxial chief ray) and is located at a position that satisfies the conditional expression (2) above, the refractive power of the refractive optical element GIT is negative. In addition, when the refractive optical element GIT is located behind (e.g., lens unit Ly) the aperture stop SP (a point of intersection P between the optical axis and a paraxial chief ray) and is located at a position that satisfies the conditional expression (2) above, the refractive power of the refractive optical element GIT is positive.

On the other hand, when the refractive optical element GIT is located in front of the aperture stop SP (a point of intersection P between the optical axis and a paraxial chief ray) and is located at a position that satisfies the conditional expression (3) above, the refractive power of the refractive optical element GIT is positive. In addition, when the refractive optical element GIT is located behind the aperture stop SP and is located at a position that satisfies the conditional expression (3) above, the refractive power of the refractive optical element GIT is negative.

In a shooting optical system, it is generally useful to not only perform achromatism for two wavelengths (correction of chromatic aberration) but also correct chromatic aberration in a wide wavelength bandwidth ranging from g-line light to C-line light. In order to correct chromatic aberration, it is useful to arrange a lens made of a material having extraordinary dispersion characteristics at a position relatively high in terms of a height (distance from the optical axis) at which a pupil paraxial light beam passes through the lens, while providing the lens with an appropriate refractive power.

However, depending on a type of zoom lens, chromatic aberration of magnification can occur in mutually reversed directions at the wide-angle end and the telephoto end. In this type of zoom lens, when chromatic aberration of magnification is corrected at the wide-angle end, the chromatic aberration of magnification at the telephoto end increases. On the other hand, when chromatic aberration of magnification is corrected at the telephoto end, the chromatic aberration of magnification at the wide-angle end increases. Accordingly, it is difficult to correct chromatic aberration of magnification that varies during zooming. This type of zoom lens includes a negative lead type zoom lens that includes, for example, first to fourth lens units having negative, positive, negative, and positive refractive powers, respectively, in order from the object side.

That type of zoom lens has, at the wide-angle end, a retrofocus type configuration that includes a front group including a first lens unit having a negative refractive power and a rear group including second through fourth lens units having a positive refractive power as a whole. On the other hand, that type of zoom lens has, at the telephoto end, a telephoto type configuration that includes a front group including a first lens unit and a second lens unit having a positive refractive power as a whole and a rear group including a third lens unit and a fourth lens unit having a negative refractive power as a whole. Accordingly, with respect to variation in chromatic aberration of magnification, chromatic aberration of magnification for g-line light occurs in an over-corrected direction at the wide-angle end and in an under-corrected direction at the telephoto end.

In order to reduce variation in chromatic aberration of magnification of the above-described type of zoom lens, it is useful to locate an optical element (lens) having extraordinary partial dispersion characteristics at an appropriate position in the zoom lens, while providing the optical element with an appropriate refractive power.

In this regard, in each exemplary embodiment of the present invention, variation in chromatic aberration of magnification occurring during zooming is corrected as described below.

Figure 5:
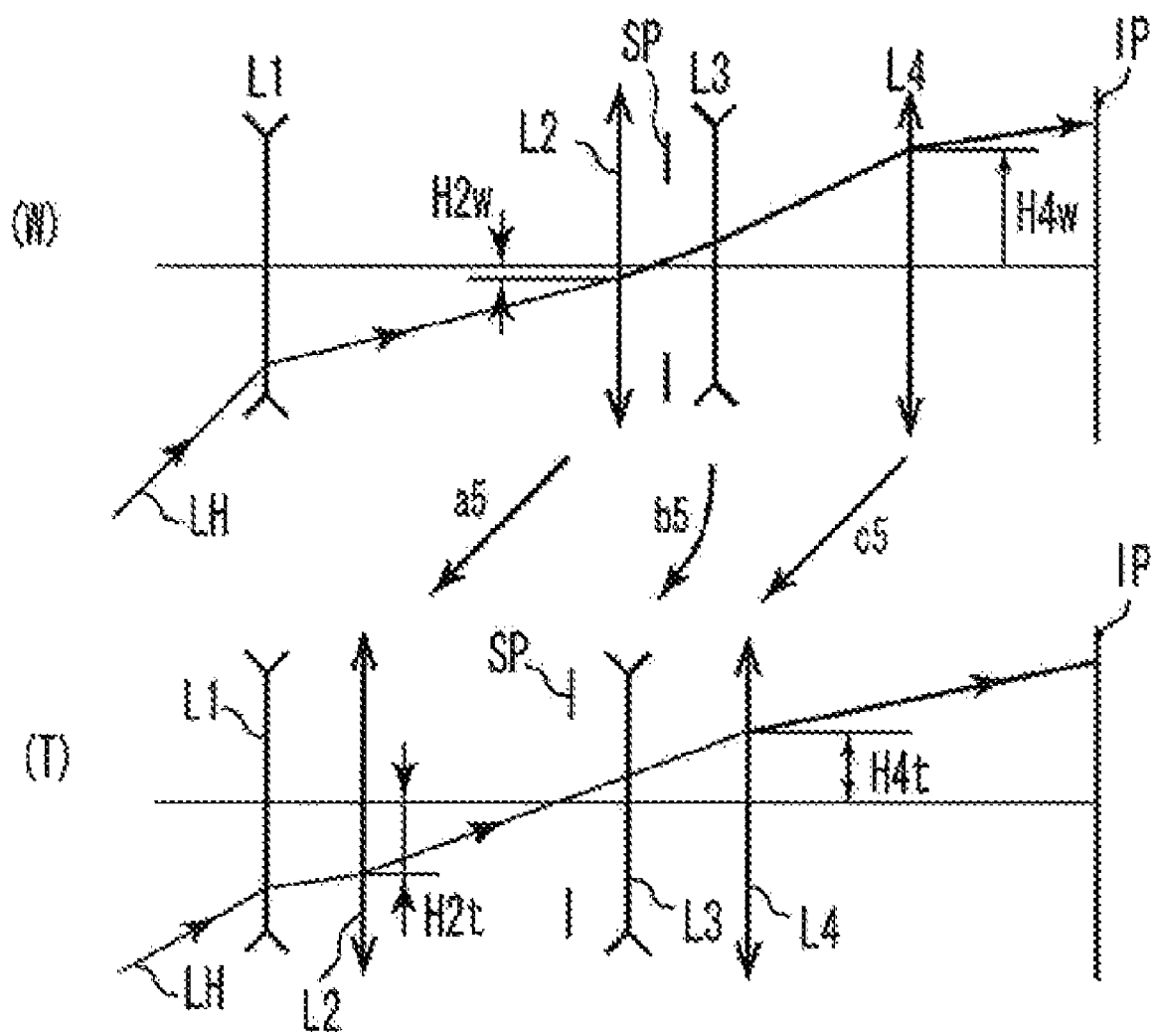
FIG. 5 illustrates an optical action of a zoom lens according to an exemplary embodiment of the present invention.

FIG. 5 illustrates an optical action of a negative lead type zoom lens. Referring to FIG. 5, "(W)" denotes a paraxial refractive power arrangement at the wide-angle end and "(T)" denotes a paraxial refractive power arrangement at the telephoto end.

"L1" denotes a first lens unit having a negative refractive power and "L2" denotes a second lens unit having a positive refractive power. "L3" denotes a third lens unit having a negative refractive power and "L4" denotes a fourth lens unit having a positive refractive power. Note that FIG. 5 shows an example in which the zoom lens includes only four lens units for easier understanding. However, the zoom lens can include another lens unit or other lens units in addition.

"SP" denotes an aperture stop. The aperture stop SP is located on the object side of the third lens unit L3 and is movable together with the third lens unit L3 during zooming. "IP" denotes a reduction side conjugate surface.

During zooming from the wide-angle end to the telephoto end, the second, third, and fourth lens units L2, L3, and L4 respectively move as indicated by the associated arrows (i.e., a5, b5, and c5).

The zoom lens shown in FIG. 5 has a retrofocus type lens configuration at the wide-angle end (W) and a telephoto type lens configuration at the telephoto end (T). Accordingly, chromatic aberration for g-line light occurs in an over-corrected direction at the wide-angle end and in an under-corrected direction at the telephoto end. Now, a description is made as to a distance (height) H of a pupil paraxial light beam LH from the optical axis at the time of incidence of the pupil paraxial light beam LH into each lens unit, with reference to FIG. 5.

The second lens unit L2 is located at a position close to the aperture stop SP at the wide-angle end, and on the other hand, is located at a position relatively distant from the aperture stop SP at the telephoto end, being moved to the object side. Accordingly, the height H of the pupil paraxial light beam LH is at a small value H2w at the wide-angle end, which position is very close to the optical axis. On the other hand, the height H of the pupil paraxial light beam LH is at a large value H2t at the telephoto end, which position is very distant from the optical axis.

In the lens unit having the arrangement describe above, in order to correct chromatic aberration of magnification for g-line light at the telephoto end, it is useful to configure a lens having a positive refractive power, using a material having extraordinary partial dispersion characteristics whose relative partial dispersion is relatively high compared to a common glass material. Alternatively, it is useful to configure a lens having a negative refractive power, using a material having extraordinary partial dispersion characteristics whose relative partial dispersion is relatively low compared to a common glass material. With this configuration, chromatic aberration of magnification occurring at the telephoto end can be corrected without increasing chromatic aberration of magnification occurring at the wide-angle end. As a result, a high optical performance can be achieved in the entire zooming area.

The fourth lens unit L4 is located at a position close to the aperture stop SP at the telephoto end, and on the other hand, is located at a position relatively distant from the aperture stop SP at the wide-angle end. Accordingly, the height H of the pupil paraxial light beam LH is at a small value H4t at the telephoto end. On the other hand, the height H of the pupil paraxial light beam LH is at a large value H4w at the wide-angle end.

In the lens unit having the arrangement describe above, in order to correct chromatic aberration of magnification for g-line light at the wide-angle end, it is useful to configure a lens having a positive refractive power, using a material having extraordinary partial dispersion characteristics whose relative partial dispersion is relatively high compared to a common glass material. Alternatively, it is useful to configure a lens having a negative refractive power, using a material having extraordinary partial dispersion characteristics whose relative partial dispersion is relatively low compared to a common glass material. With this configuration, chromatic aberration of magnification occurring at the wide-angle end can be corrected without increasing chromatic aberration of magnification occurring at the telephoto end. As a result, a high optical performance can be achieved in the entire zooming area.

As described above, locating an optical element (lens) having high extraordinary partial dispersion characteristics at a position in which the distance between the optical element and the aperture stop SP varies between at the wide-angle end and at the telephoto end facilitates reducing variation in chromatic aberration of magnification occurring during zooming.

FIGS. 1 through 4 each show an example in which an optical element GIT having high extraordinary partial dispersion characteristics is arranged based on the conception described above.

Note that FIG. 5 shows an example of an optical system that includes lens units having negative, positive, negative, and positive refractive powers in order from the object side to the image side. However, the present invention is not limited to this configuration. The present invention can be applied to zoom lenses regardless of zooming type.

As shown in FIGS. 1 through 4, it is useful to locate an optical element GIT made of a solid material having high extraordinary partial dispersion characteristics and provided with an appropriate refractive power at a position that can satisfy the conditional expression (2) or (3). With this configuration, variation in chromatic aberration of magnification occurring during zooming can be reduced.

Now, a technical significance of each conditional expression described above is described.

The conditional expressions (2) and (3) were developed in consideration of the above reasons. The conditional expressions (2) and (3) are intended to set the position of a refractive optical element GIT used for correcting variation of a chromatic aberration of magnification occurring during zooming.

When the refractive optical element GIT is located at a position in which the lower limit value of the conditional expression (2) or (3) is exceeded, the difference between the distances from the aperture stop SP to the refractive optical element GIT at the wide-angle end and the telephoto end, respectively, becomes small. As a result, when chromatic aberration of magnification is corrected at either one of the wide-angle end and the telephoto end, chromatic aberration of magnification increases at the other zooming end. Accordingly, it can be difficult to achieve a high optical performance in the entire zooming area.

In order to achieve a higher effect of correcting chromatic aberration, it is useful to alter the range of numerical values of the conditional expressions (2) and (3) as follows:

$$dt/dw > 1.4 \quad (2a)$$

$$dw/dt > 1.4 \quad (3a).$$

It is more useful to alter the range of numerical values of the conditional expressions (2) and (3) as follows:

$$dt/dw > 1.7 \quad (2b)$$

$$dw/dt > 1.7 \quad (3b).$$

Conventionally, an extraordinary partial dispersion material such as a fluorite, which is used for correcting chromatic aberration, is made of a low-dispersion glass having a large Abbe number value. Accordingly, chromatic aberration does not vary unless the power on a lens surface is varied.

Thus, it can be difficult to correct both chromatic aberration and various aberrations such as spherical aberration, coma, and astigmatism at the same time. Accordingly, it is useful to correct chromatic aberration of magnification by using a lens made of a solid material having relatively high dispersion characteristics and high extraordinary partial dispersion characteristics.

The conditional expressions (1), (4), (5), and (6) were developed in consideration of the above reasons. Each of the conditional expressions (1), (4), (5), and (6) expresses a relationship between an Abbe number $vd$ and relative partial dispersions $\theta gF$ and $\theta gd$ for correcting chromatic aberration of magnification.

In order to achieve a higher effect of correcting chromatic aberration, it is useful to alter the range of numerical values of the conditional expression (1) as follows:

$$\theta gF - (-1.665 \times 10^{-7} \cdot vd^3 + 5.213 \times 10^{-5} \cdot vd^2 - 5.656 \times 10^{-3} \cdot vd + 0.762) > 0 \quad (1a).$$

It is more useful to alter the range of numerical values of the conditional expression (1) as follows:

$$\theta gF - (-1.665 \times 10^{-7} \cdot vd^3 + 5.213 \times 10^{-5} \cdot vd^2 - 5.656 \times 10^{-3} \cdot vd + 0.870) < 0 \quad (7).$$

It is further useful to alter the range of numerical values of the conditional expression (1) as follows:

$$\theta gF - (-1.665 \times 10^{-7} \cdot vd^3 + 5.213 \times 10^{-5} \cdot vd^2 - 5.656 \times 10^{-3} \cdot vd + 0.825) < 0 \quad (7a).$$

In order to achieve a higher effect of correcting chromatic aberration, it is useful to alter the range of numerical values of the conditional expression (4) as follows:

$$\theta gd - (-1.687 \times 10^{-7} \cdot vd^3 + 5.702 \times 10^{-5} \cdot vd^2 - 6.603 \times 10^{-3} \cdot vd + 1.513) > 0 \quad (4a).$$

It is more useful to alter the range of numerical values of the conditional expression (4) as follows:

$$\theta gd - (-1.687 \times 10^{-7} \cdot vd^3 + 5.702 \times 10^{-5} \cdot vd^2 - 6.603 \times 10^{-3} \cdot vd + 1.809) < 0 \quad (8).$$

It is further useful to alter the range of numerical values of the conditional expression (4) as follows:

$$\theta gd - (-1.687 \times 10^{-7} \cdot vd^3 + 5.702 \times 10^{-5} \cdot vd^2 - 6.603 \times 10^{-3} \cdot vd + 1.580) < 0 \quad (8a).$$

In order to achieve a higher effect of correcting chromatic aberration, it is useful to alter the range of numerical values of the conditional expression (5) as follows:

$$vd < 45 \quad (5a).$$

It is more useful to alter the range of numerical values of the conditional expression (5) as follows:

$$vd < 30 \quad (5b).$$

In order to achieve a higher effect of correcting chromatic aberration, it is useful to alter the range of numerical values of the conditional expression (6) as follows:

$$\theta gF - (-1.665 \times 10^{-7} \cdot vd^3 + 5.213 \times 10^{-5} \cdot vd^2 - 5.656 \times 10^{-3} \cdot vd + 0.675) < 0 \quad (6a).$$

It is more useful to alter the range of numerical values of the conditional expression (6) as follows:

$$\theta gF - (-1.665 \times 10^{-7} \cdot vd^3 + 5.213 \times 10^{-5} \cdot vd^2 - 5.656 \times 10^{-3} \cdot vd + 0.600) < 0 \quad (6b).$$

Conditions that can be satisfied by an optical material used to form the refractive optical element GIT are described above.

A specific example of a solid material that can satisfy the conditional expressions (1), (4), and (5) (hereinafter also referred to as an "optical material") includes a resin. Among various kinds of resins, an ultraviolet (UV) curable resin (nd=1.635, vd=22.7, θgF=0.69) and an N-polyvinylcarbazole (nd=1.696, vd=17.7, θgF=0.69), especially, can be used as an optical material that can satisfy the conditional expressions (1), (4), and (5).

Note that the type of resin is not limited to those mentioned as long as the resin can satisfy the conditional expressions (1), (4), and (5).

In addition, an optical material that has characteristics different from characteristics of a common glass material includes a mixture prepared by dispersing the following inorganic oxide nanoparticles into a synthetic resin (transparent medium).

For example nanoparticles such as the following can be used, $TiO_2$ (Nd=2.304, vd=13.8), $Nb_2O_5$ (Nd=2.367, vd=14.0), ITO (Nd=1.8581, vd=5.53), $Cr_2O_3$ (Nd=2.2178, vd=13.4), $BaTiO_3$ (Nd=2.4362, vd=11.3), and others known by one of ordinary skill.

An optical material that can satisfy the conditional expressions (1), (4), and (5) can be obtained by dispersing $TiO_2$ (Nd=2.304, νd=13.8, θgF=0.87) particles, among the inorganic oxides described above, into a synthetic resin in an appropriate specific volume.

TiO$_2$ is a material used for various purposes. In the field of optics, TiO$_2$ is used as an evaporating material to form an optical thin film such as an anti-reflection film. In addition, TiO$_2$ is used as a photocatalyst and a white pigment. In addition, fine TiO$_2$ particles are used as a material for cosmetics.

An average diameter of a fine TiO$_2$ particle to be dispersed into a resin in each exemplary embodiment of the present invention can be about 2 nm to 50 nm, considering an affect from a phenomenon of scattering. A dispersing agent can be added thereto in order to suppress flocculation.

A medium material for dispersing TiO$_2$ particles includes a polymer. A polymer can be superior in mass-producibility by photopolymerization molding or thermopolymerization using a forming die.

In addition, with respect to characteristics of an optical constant of a polymer, a polymer having a relatively high relative partial dispersion, a polymer having a relatively small Abbe number, and/or a polymer that can satisfy both of these conditions are useful. Furthermore, N-polyvinylcarbazole, styrene, and a polymethyl methacrylate (acryl), and the like can be used. Note that in an exemplary embodiment to be described below, a UV curable resin and N-polyvinylcarbazole are used as a host polymer into which fine TiO$_2$ particles are dispersed. However, the configuration is not limited to this.

A dispersion characteristic N(λ) of a mixture prepared by dispersing nanoparticles can be easily obtained by computation by the following expression that is derived from a well-known Drude equation. That is, a dispersion characteristic N(λ) at a wavelength λ is computed by the following equation:

$$N(\lambda)=[1+V\{N_{INO}^2(\lambda)-1\}+(1-V)\{N_P^2(\lambda)-1\}]^{1/2}$$

where "λ" denotes an arbitrary wavelength, "$N_{INO}$" denotes a refractive index of nanoparticles, "$N_P$" denotes a refractive index of a polymer, and "V" denotes a total volume fraction of the nanoparticles to the volume of the polymer.

In addition, a specific example of a solid optical material that can satisfy the conditional expression (6) includes a mixture prepared by dispersing fine particles of an inorganic oxide described below into a synthetic resin.

For example, nanoparticles such as TiO$_2$ (nd=2.2652, νd=11.8), Nb$_2$O$_5$ (nd=2.367, νd=14.0), ITO (nd=1.8581, νd=5.53), Cr$_2$O$_3$ (nd=2.2178, νd=13.4), BaTiO$_3$ (nd=2.4362, νd=11.3), and others known by one of ordinary skill in the relevant arts.

Among these, indium-tin oxide (ITO) has an especially small Abbe number compared to other chemicals, and accordingly, is especially useful. With respect to ITO, a free carrier arising due to its conductivity has an effect on its refractive index, unlike other ordinary chemicals.

Figure 20A:
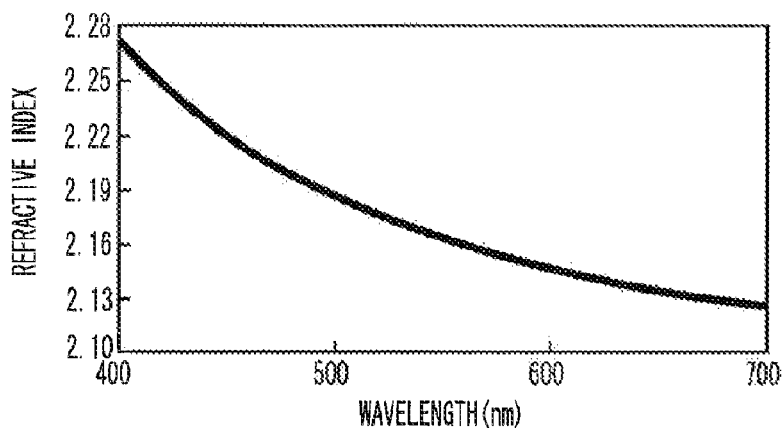
FIGS. 20A through 20C illustrate dispersion characteristics of an indium-tin oxide (ITO).
Figure 20B:
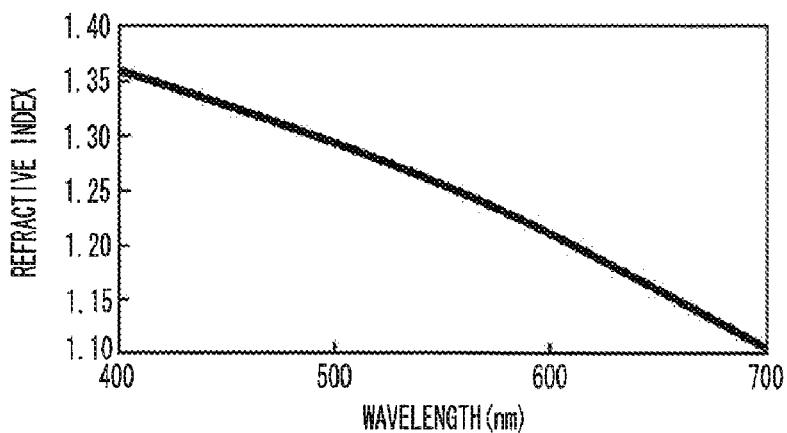
Figure 20C:
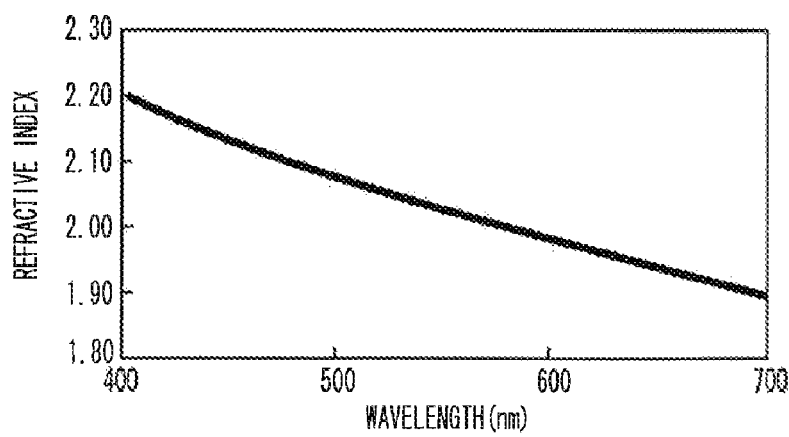

The dispersion characteristics of ITO (see FIG. 20C) are formed as a result of a combination of a variation of refractive index in a short wavelength region occurring due to normal electron transition (see FIG. 20A) with a refractive index dispersion in an infrared region occurring due to free carriers (see FIG. 20B). Thus, dispersion characteristics of ITO exhibit wavelength dependency having an significant gradient corresponding to an Abbe number of 5.53.

In addition, the refractive index dispersion occurring due to electron transition (FIG. 20A) exhibits a rapid variation on a short wavelength side in the visible range. On the other hand, the refractive index dispersion occurring due to free carrier (FIG. 20B) exhibits a rapid variation on a long wavelength side in the visible range. When the effects of these two refractive index dispersions are combined, the relative partial dispersion becomes small compared to the relative partial dispersion occurring due to a normal electron transition.

Candidates of a material that is transparent and likely to be subject to the effect of free carriers include SnO$_2$, ATO (SnO$_2$ doped with antimony), ZnO, and others known by one of ordinary skill in the relevant arts.

ITO is known as a material that can be used to form a transparent electrode, and is commonly used in a liquid crystal display element and an electroluminescent (EL) element. In addition, for other purposes, ITO is used in an infrared ray blocking element and an ultraviolet ray blocking element.

Conventionally, ITO is used in a range of thickness of 50 nm to 500 nm, and is not used for correcting chromatic aberration in an optical system as a mixture of fine particles.

In the present exemplary embodiment, a solid material that can satisfy the conditional expressions (1), (4), (5), and (6) can be applied to a lens in an optical system and/or to a layer formed on a lens surface. When a refractive surface formed with that material is made aspheric, a chromatic aberration flare such as spherical aberration of color can be corrected.

In addition, it is useful to form an interface with that material and an ambient atmosphere such as air or to form an interface with that material and a material having a relatively low refractive index, because, with this configuration, chromatic aberration can be varied in a relatively large amount with a small variation in the interface.

In addition, it is useful in correcting aberration to use a plurality of materials that can satisfy the conditional expressions (1), (4), (5), and (6) in a lens in an optical system and/or in a layer formed on a lens surface, because a power of each lens can be made small.

In addition, an optical material that can satisfy the conditional expressions (1), (4), (5), and (6) is more useful if the optical material can satisfy the following condition:

$$|dn/dT|<2.5\times10^{-4}(1/°C.) \quad (9)$$

where "|dn/dT|" stands for an absolute value of a rate of change of refractive index for d-line light of the optical material with respect to temperature change in a range of 0° to 40° C.

If the upper limit value of the conditional expression (9) is exceeded, it can be difficult to maintain a useful optical performance in a temperature range of 0° to 40° C.

Now, zoom lenses according to various numerical examples of the present invention are described below.

Figure 6:
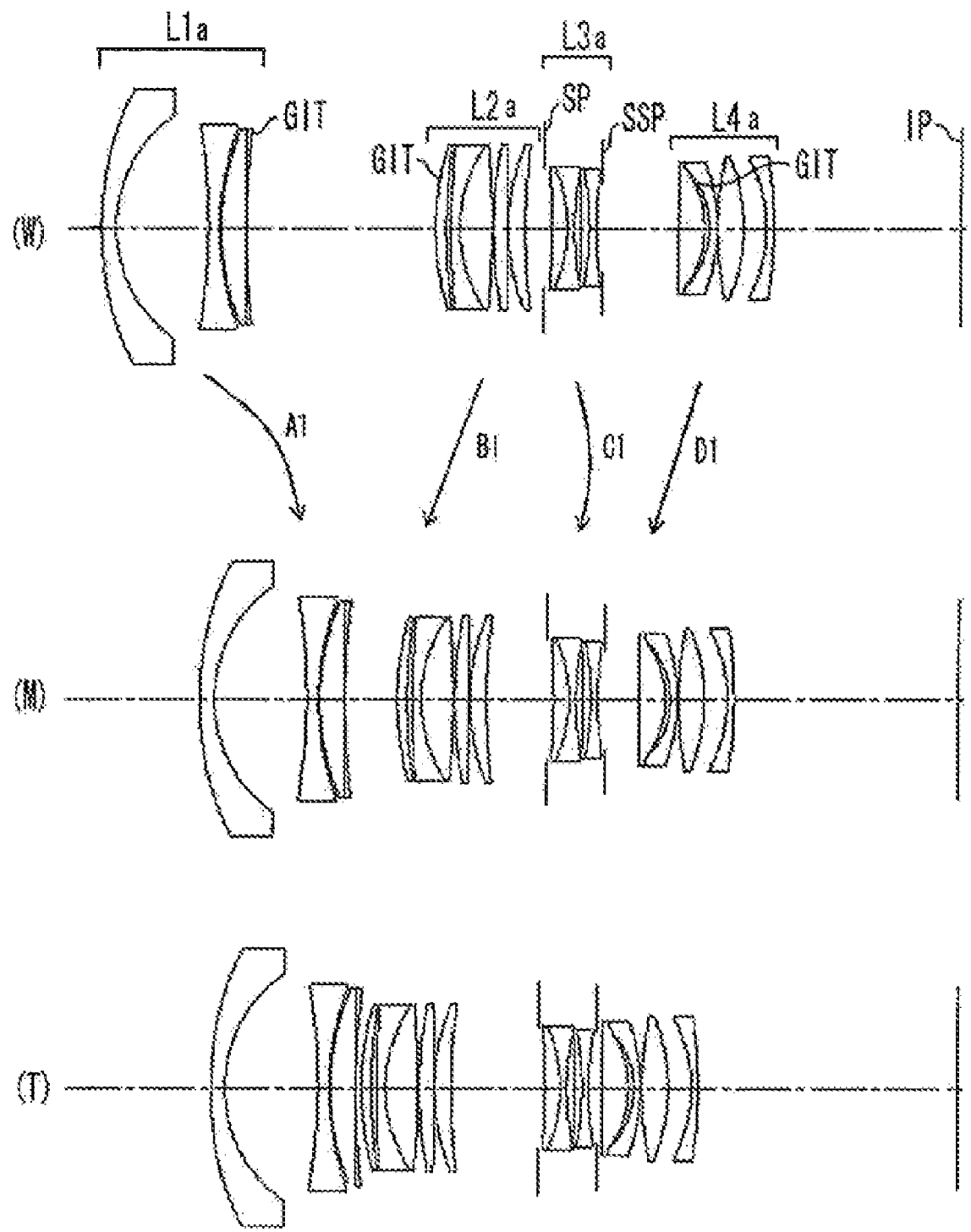
FIG. 6 illustrates an optical cross section of a zoom lens according to a numerical example 1 of the present invention.
Figure 7C:
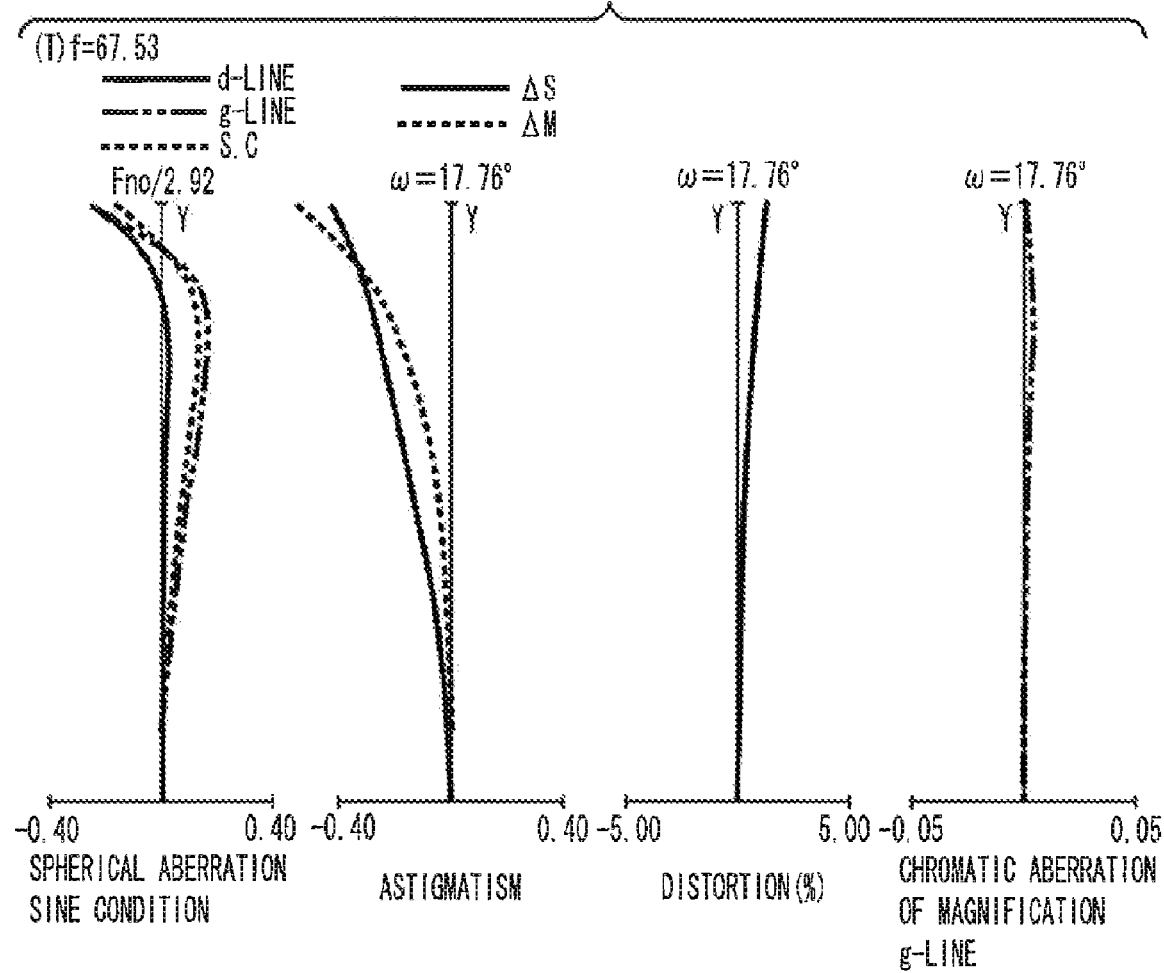

Referring to FIG. 6, "(W)", "(M)", and "(T)" denote cross sections of a zoom lens at the wide-angle end, a middle focal length position, and the telephoto end, respectively, according to a numerical example 1. FIGS. 7A through 7C are aberration charts at the wide-angle end, the middle focal length position, and the telephoto end, respectively, of the zoom lens according to the numerical example 1.

Figure 8:
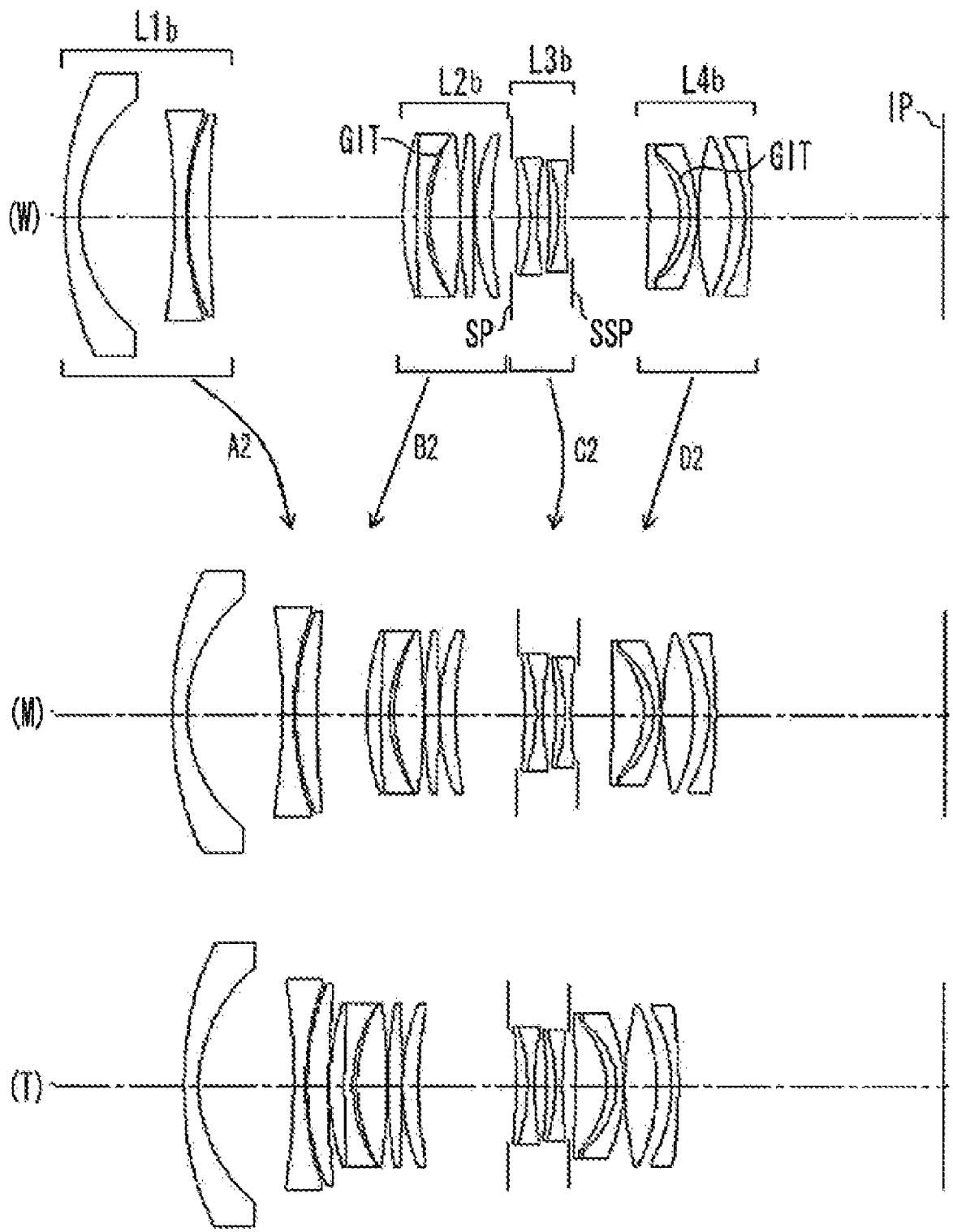
FIG. 8 illustrates an optical cross section of a zoom lens according to a numerical example 2 of the present invention.

Referring to FIG. 8, "(W)", "(M)", and "(T)" denote cross sections of a zoom lens at the wide-angle end, a middle focal length position, and the telephoto end, respectively, according to a numerical example 2. FIGS. 9A through 9C are aberration charts at the wide-angle end, the middle focal length position, and the telephoto end, respectively, of the zoom lens according to the numerical example 2.

Figure 10:
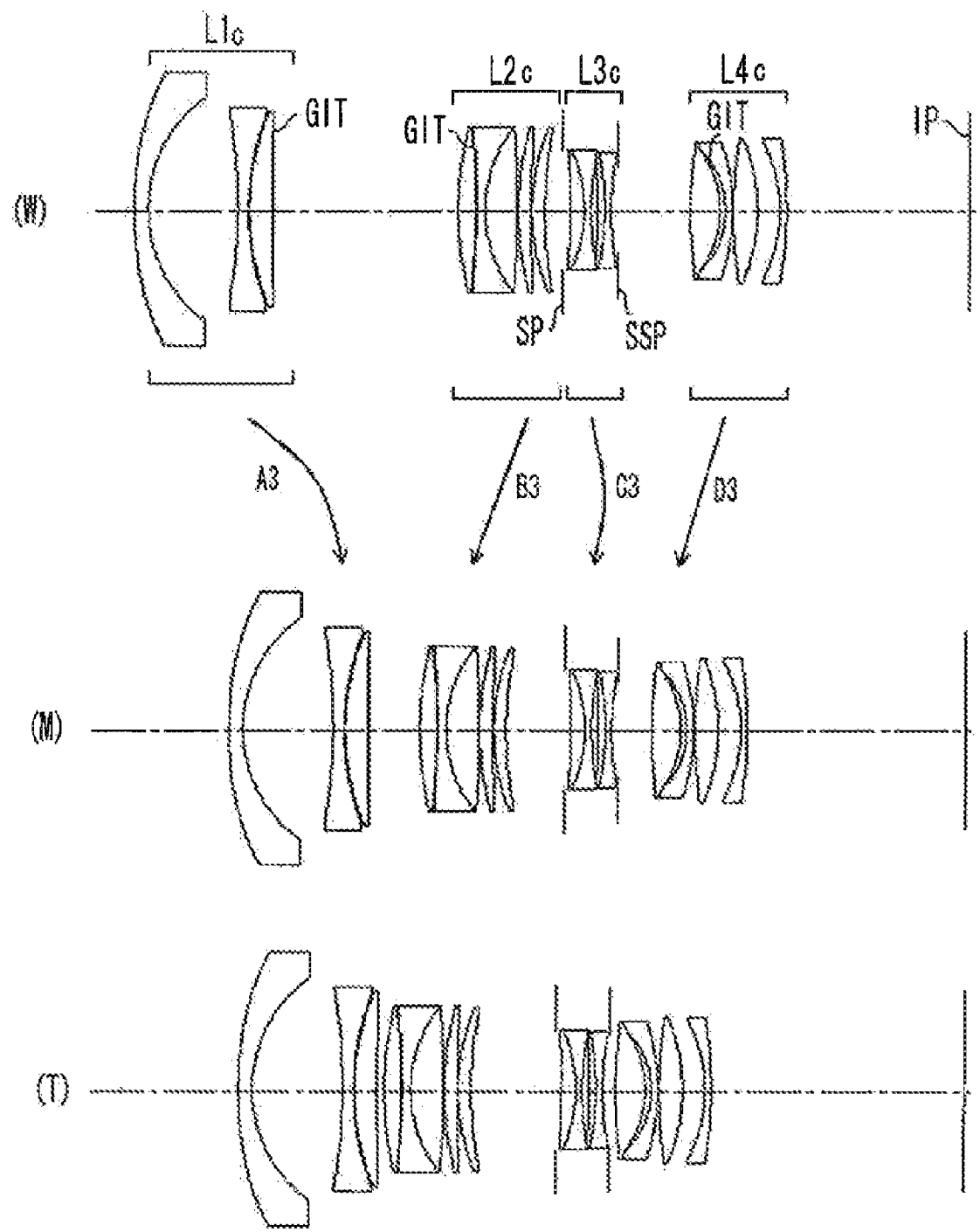
FIG. 10 illustrates an optical cross section of a zoom lens according to a numerical example 3 of the present invention.
Figure 11C:
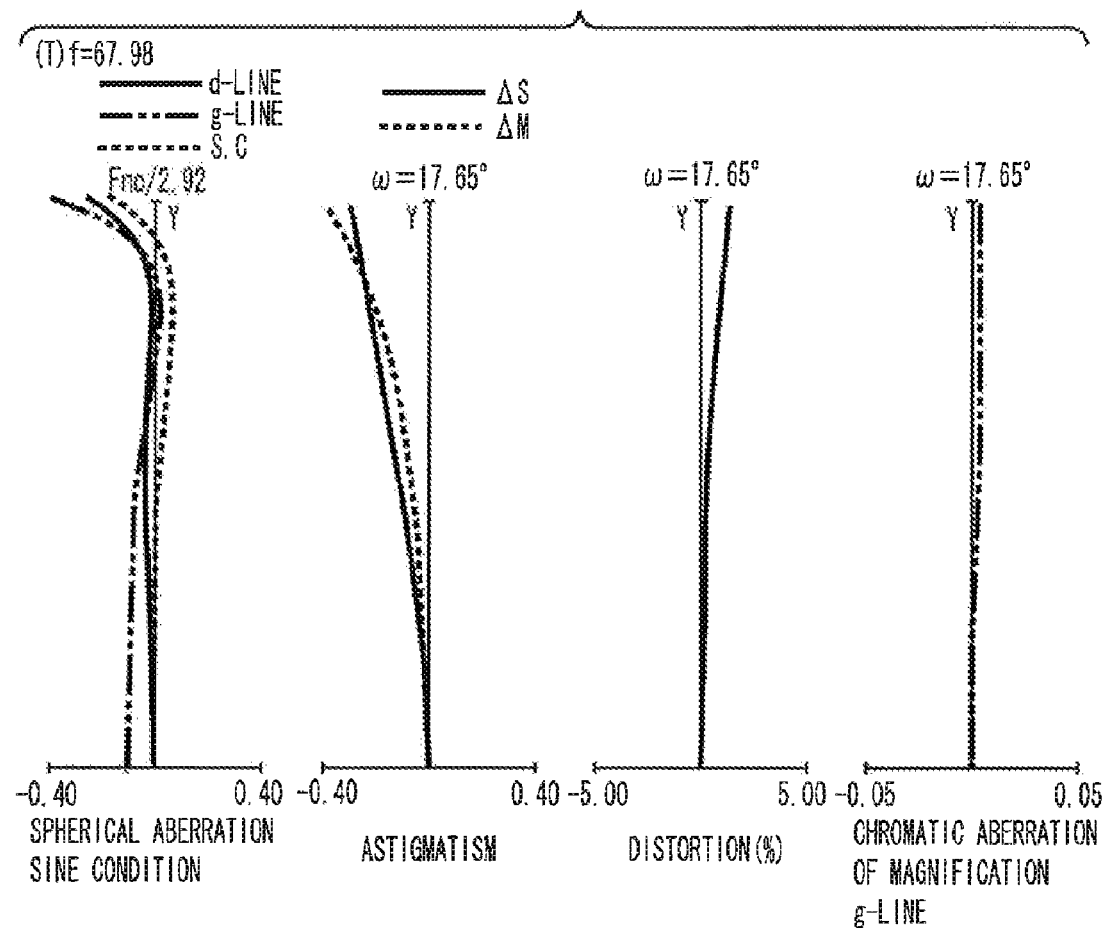

Referring to FIG. 10, "(W)", "(M)", and "(T)" denote cross sections of a zoom lens at the wide-angle end, a middle focal length position, and the telephoto end, respectively, according to a numerical example 3. FIGS. 11A through 11C are aberration charts at the wide-angle end, the middle focal length position, and the telephoto end, respectively, of the zoom lens according to the numerical example 3.

Figure 12:
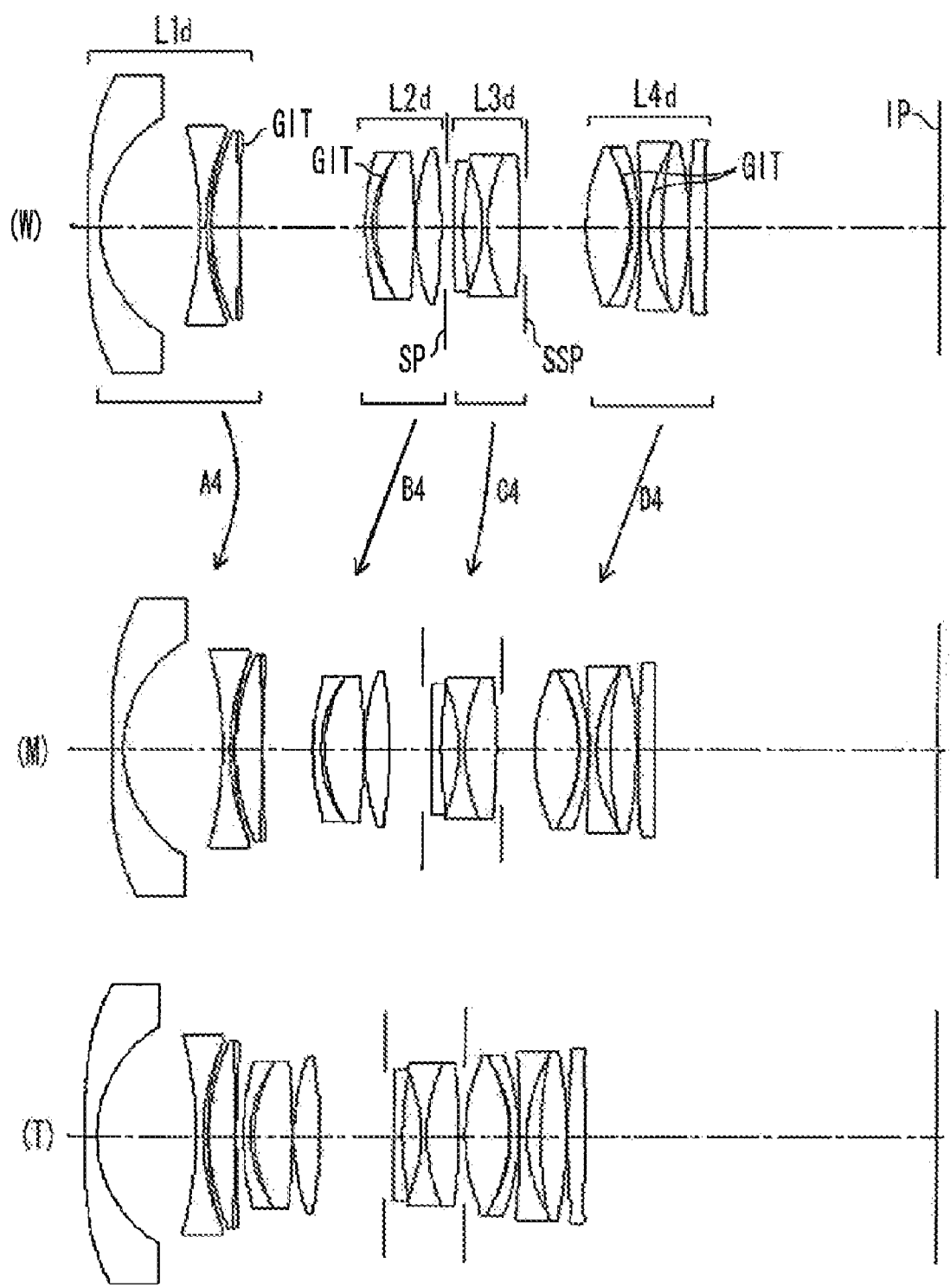
FIG. 12 illustrates an optical cross section of a zoom lens according to a numerical example 4 of the present invention.
Figure 13A:
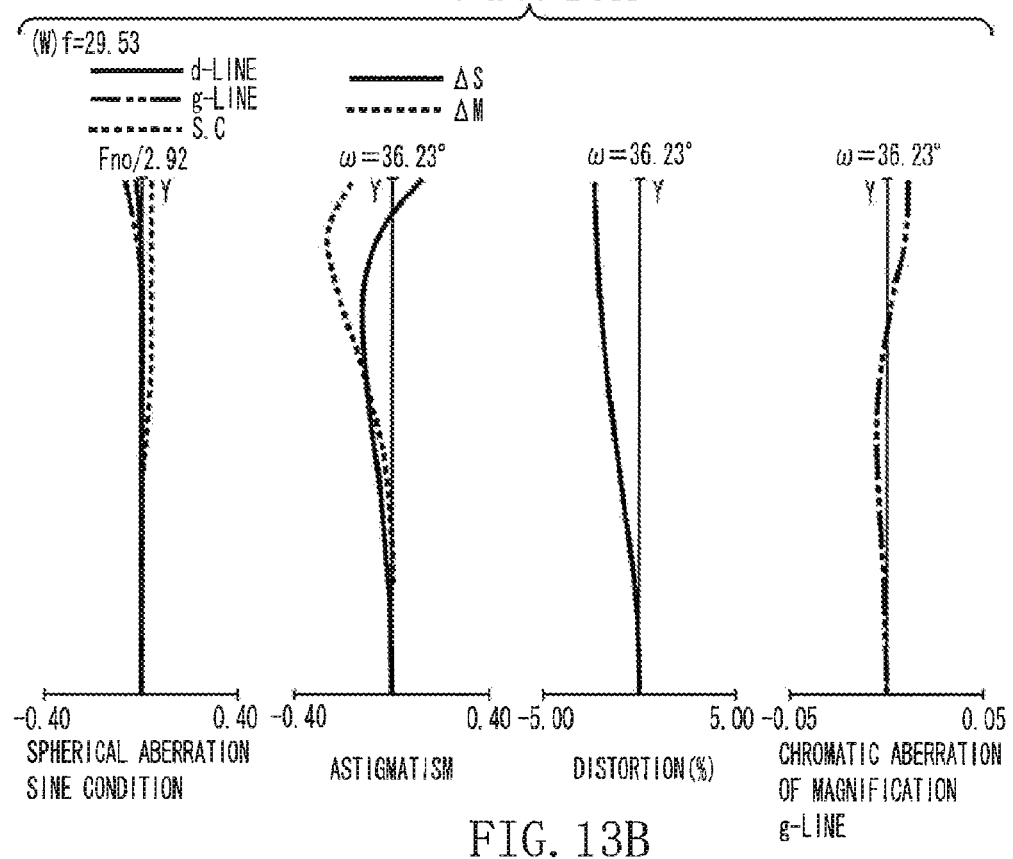
Figure 13B:
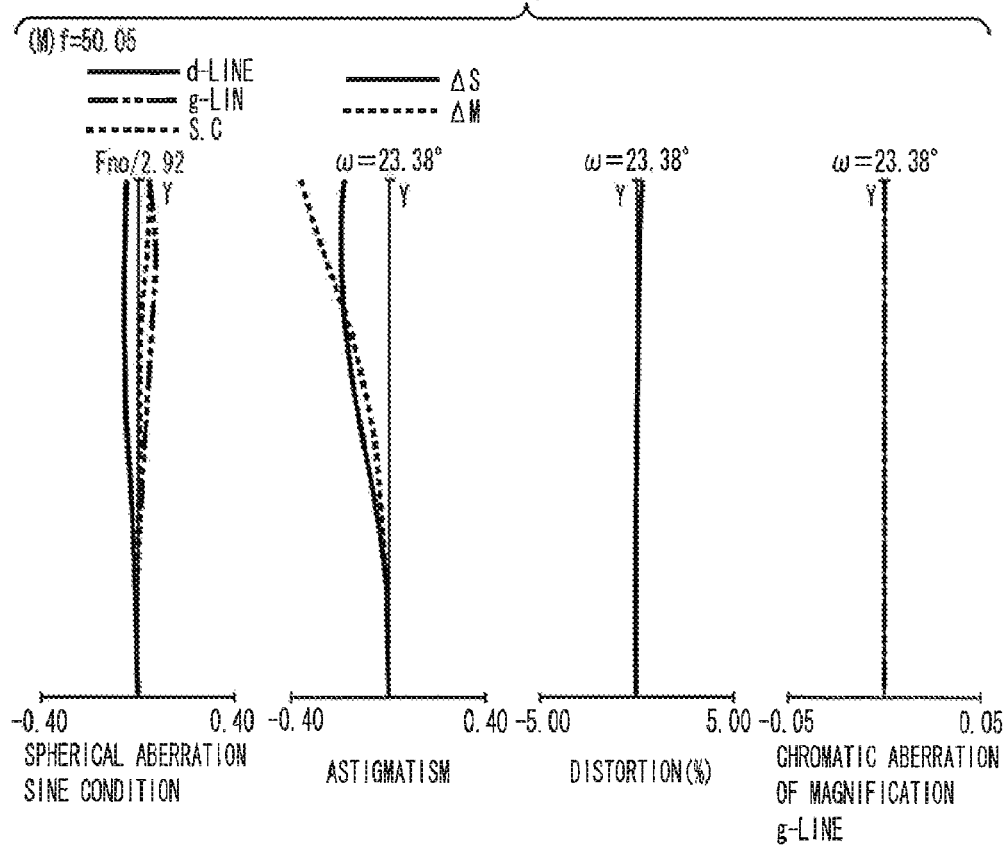

Referring to FIG. 12, "(W)", "(M)", and "(T)" denote cross sections of a zoom lens at the wide-angle end, a middle focal length position, and the telephoto end, respectively, according to a numerical example 4. FIGS. 13A through 13C are aberration charts at the wide-angle end, the middle focal length position, and the telephoto end, respectively, of the zoom lens according to the numerical example 4.

Figure 14:
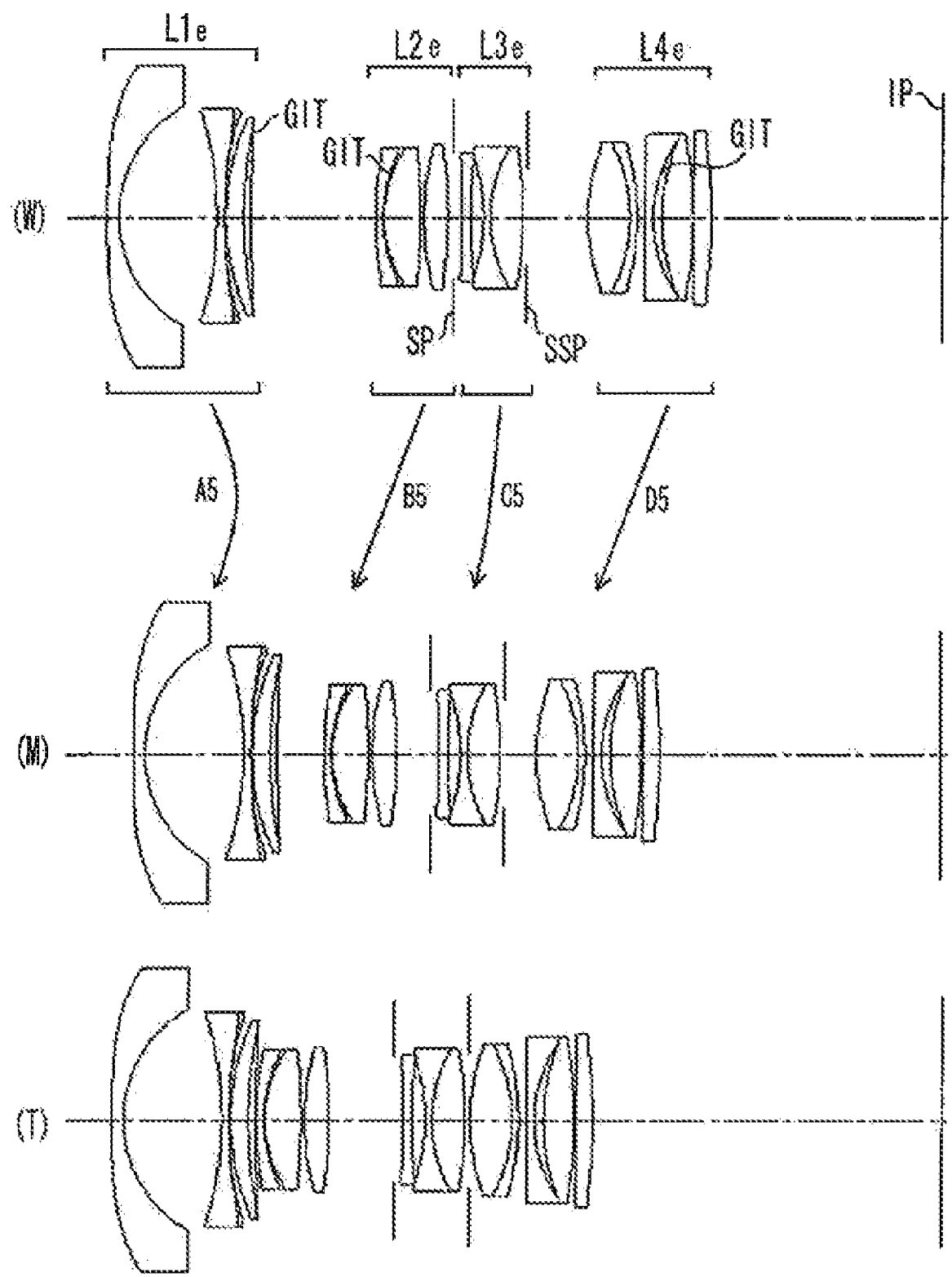
FIG. 14 illustrates an optical cross section of a zoom lens according to a numerical example 5 of the present invention.
Figure 15A:
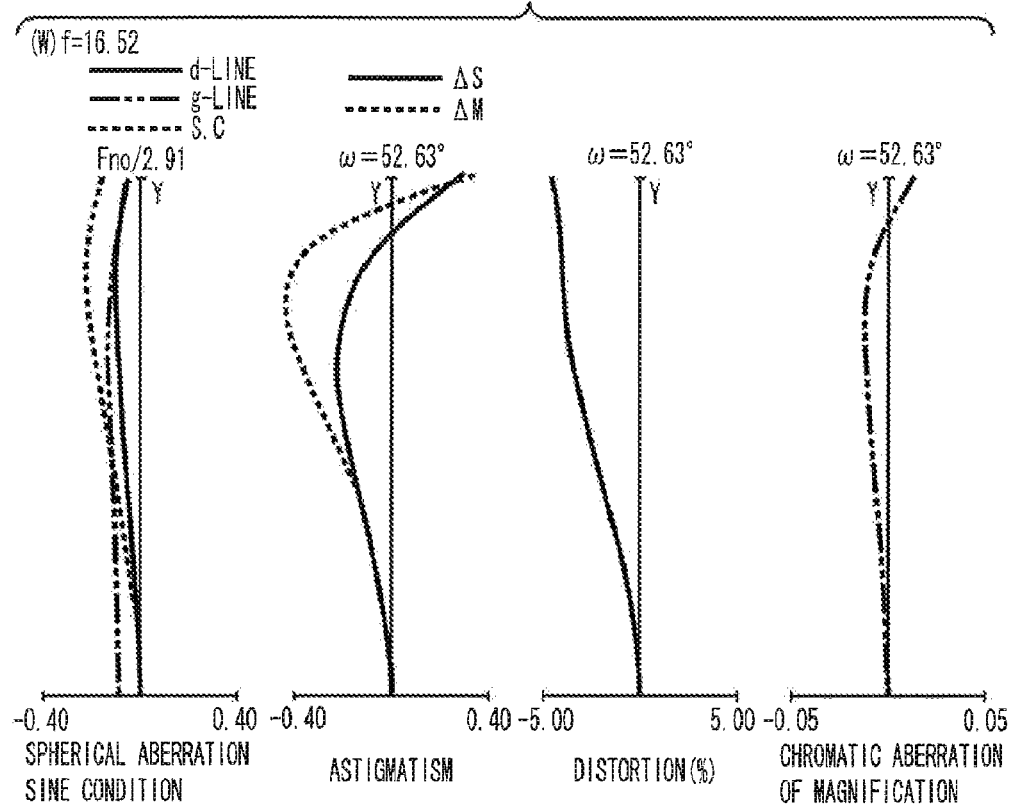
FIGS. 15A through 15C are aberration charts of the zoom lens according to the numerical example 5 of the present invention.
Figure 15B:
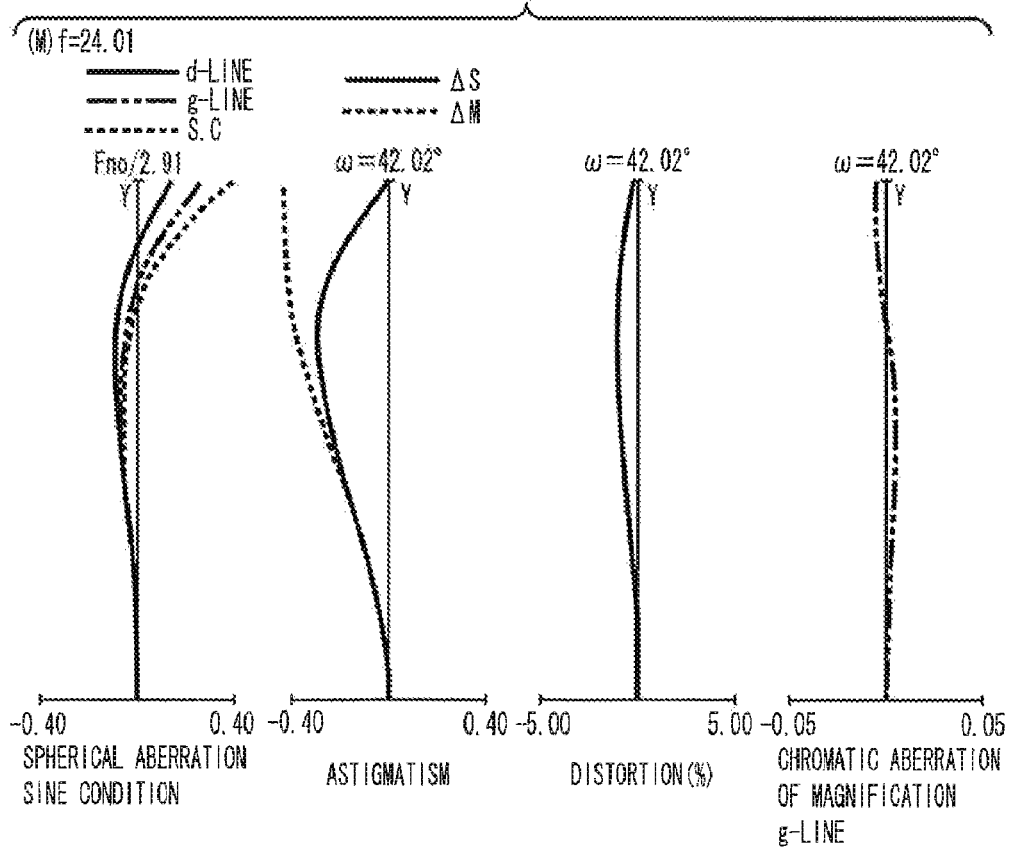
Figure 15C:
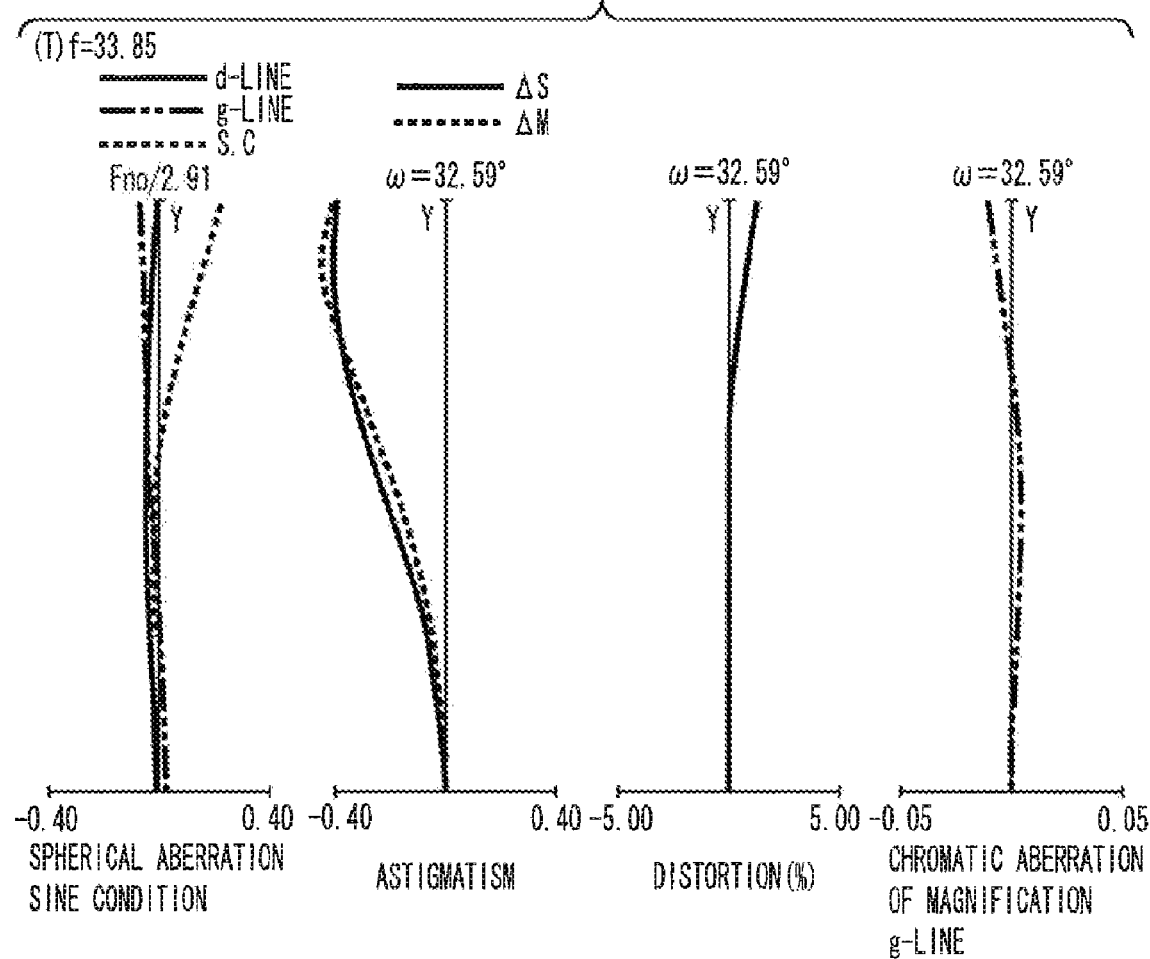

Referring to FIG. 14, "(W)", "(M)", and "(T)" denote cross sections of a zoom lens at the wide-angle end, a middle focal length position, and the telephoto end, respectively, according to a numerical example 5. FIGS. 15A through 15C are aberration charts at the wide-angle end, the middle focal length position, and the telephoto end, respectively, of the zoom lens according to the numerical example 5.

Figure 16:
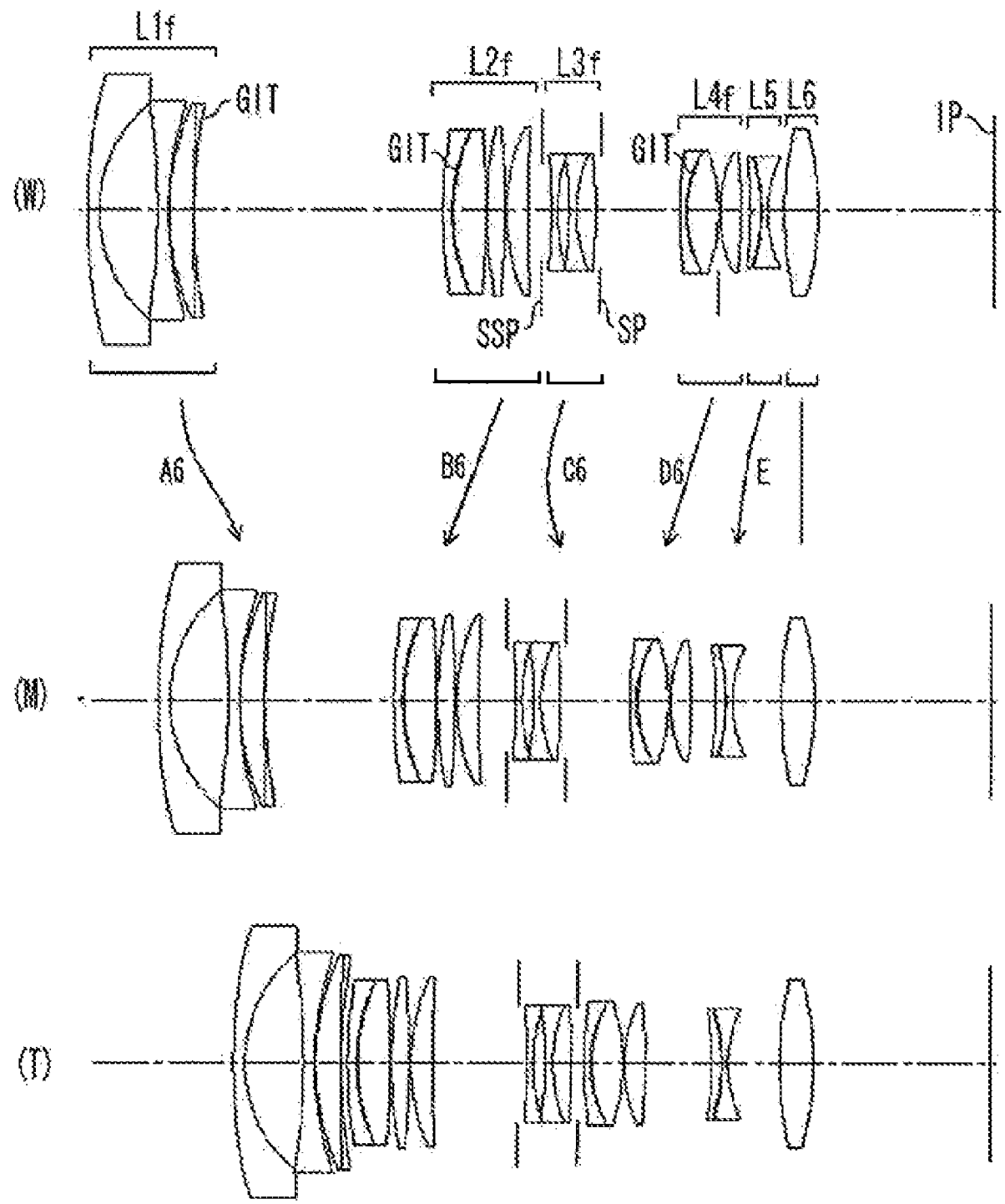
FIG. 16 illustrates an optical cross section of a zoom lens according to a numerical example 6 of the present invention.
Figure 17A:
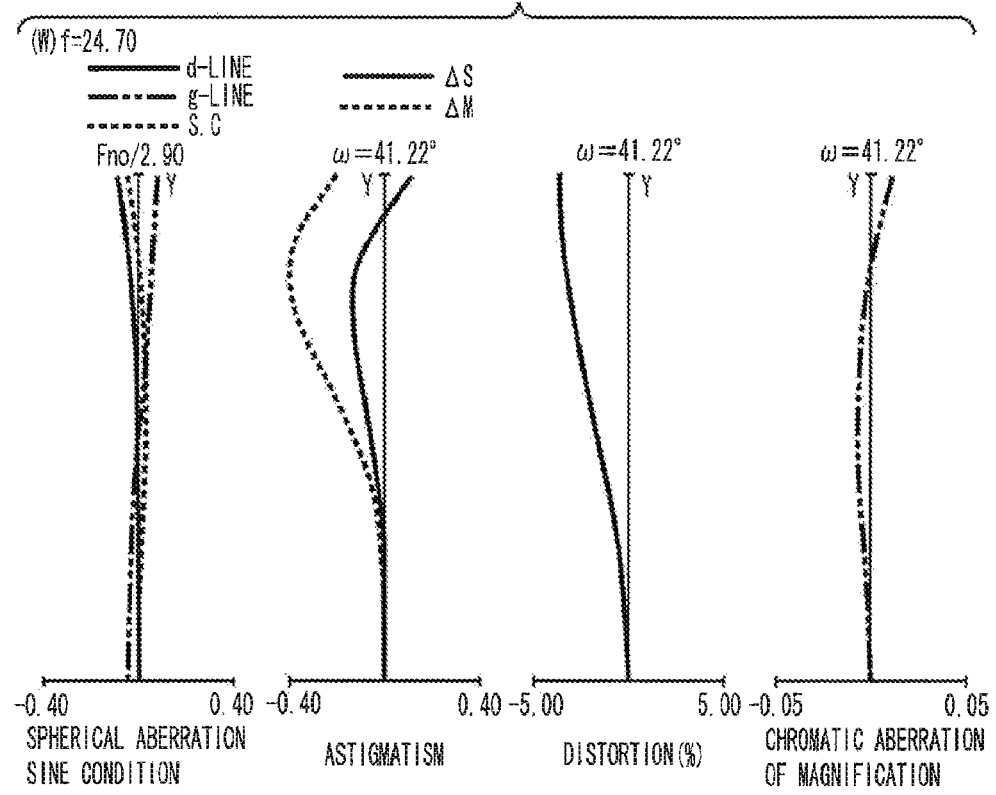
FIGS. 17A through 17C are aberration charts of the zoom lens according to the numerical example 6 of the present invention.
Figure 17B:
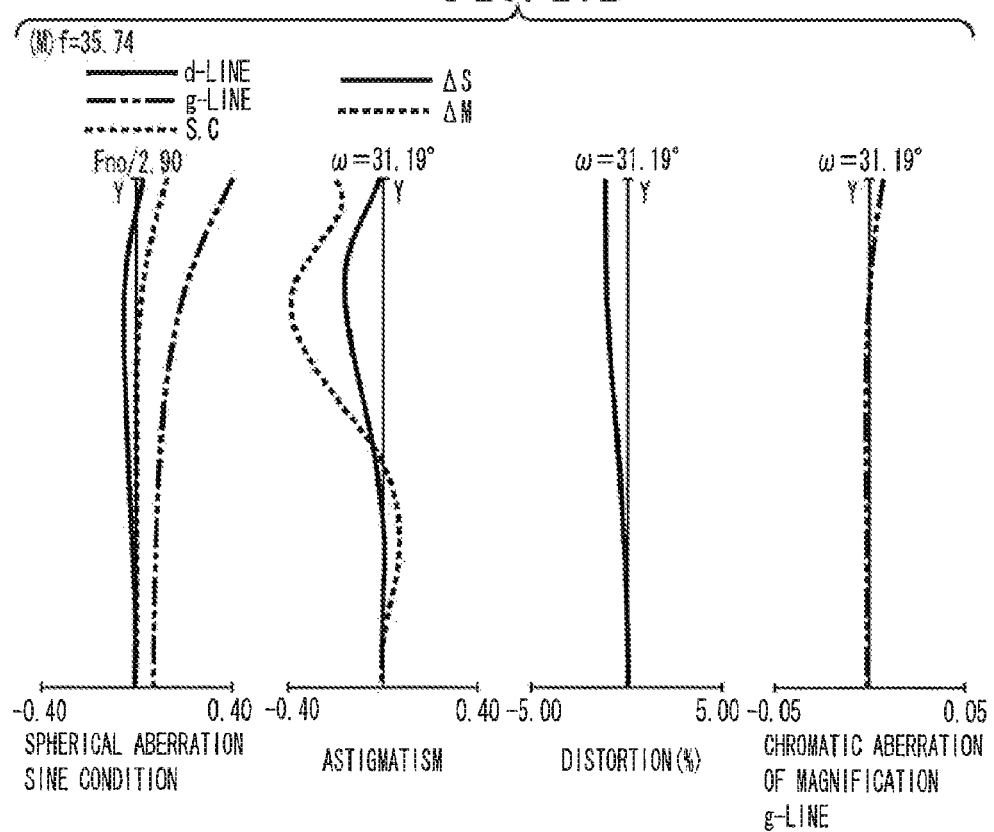
Figure 17C:
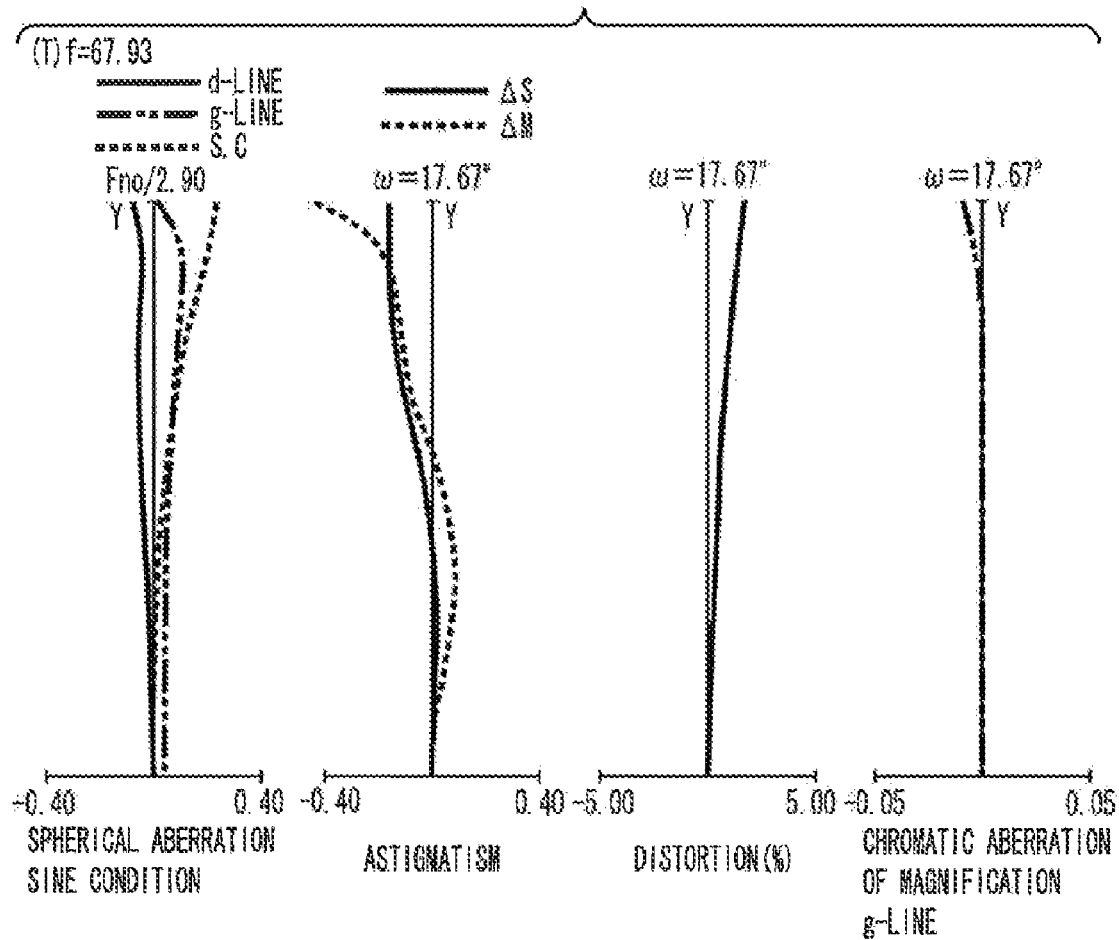

Referring to FIG. 16, "(W)", "(M)", and "(T)" denote cross sections of the zoom lens at the wide-angle end, a middle focal length position, and the telephoto end, respectively, according to a numerical example 6. FIGS. 17A through 17C are aberration charts at the wide-angle end, the middle focal length position, and the telephoto end, respectively, of the zoom lens according to the numerical example 6.

Figure 18:
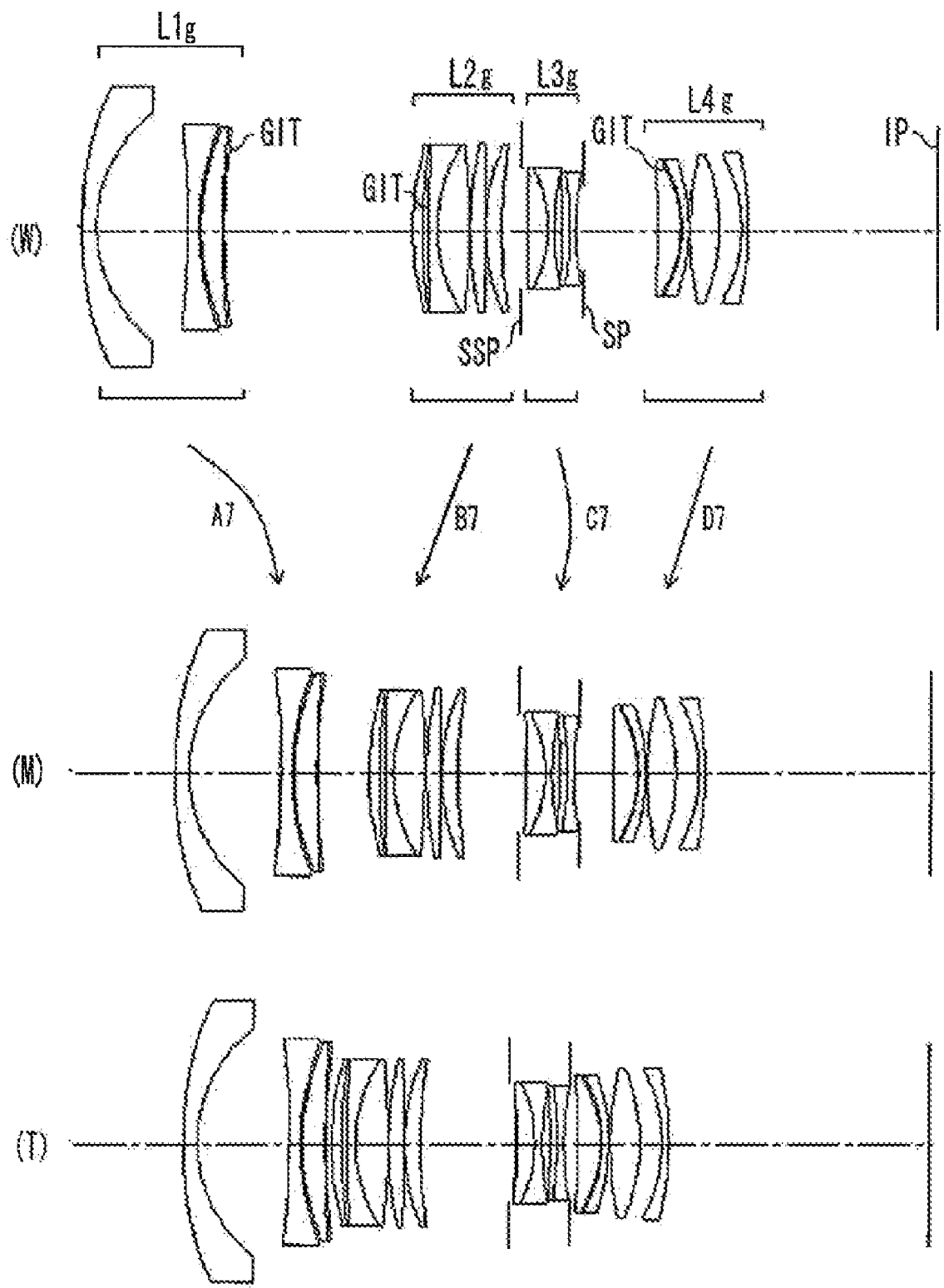
FIG. 18 illustrates an optical cross section of a zoom lens according to a numerical example 7 of the present invention.
Figure 19C:
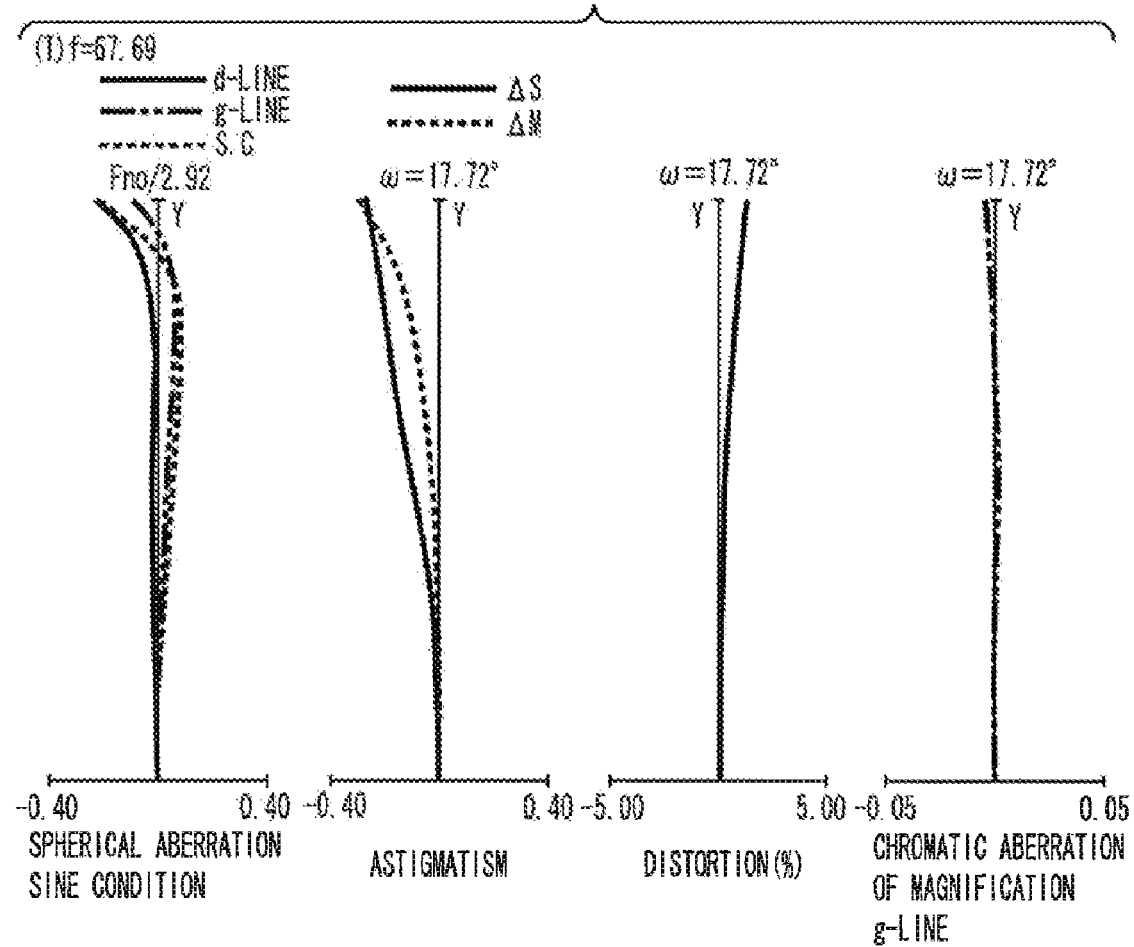

Referring to FIG. 18, "(W)", "(M)", and "(T)" denote cross sections of a zoom lens at the wide-angle end, a middle focal length position, and the telephoto end, respectively, according to a numerical example 7. FIGS. 19A through 19C are aberration charts at the wide-angle end, the middle focal length position, and the telephoto end, respectively, of the zoom lens according to the numerical example 7.

The zoom lens according to each numerical example is a photographic lens system that is used with an image pickup apparatus. Accordingly, in the cross section of the zoom lens, a left portion indicates an object side (front side) and a right portion indicates an image side (rear side).

Components similar to those shown in FIG. 5 are provided with the same reference numerals and symbols. "SSP" denotes a full-aperture F-number stop that regulates a full-aperture F number. "IP" denotes an image plane on which a solid-state image sensor such as a charge-coupled device (CCD) sensor is arranged. "GIT" denotes a refractive optical element similar to the one described above. Arrows in a continuous line indicates a moving locus of each lens unit during zooming from the wide-angle end to the telephoto end.

Note that in each numerical example, the wide-angle end and the telephoto end refer to zooming positions when a lens unit for varying magnification (the second lens unit L2a-g in each numerical example) is located at the respective ends of a range in which the lens unit can mechanically move along an optical axis.

In each of the aberration charts, "d" and "g" respectively denote d-line and g-line light. "ΔM" and "ΔS" respectively denote a meridional image plane and a sagittal image plane. Chromatic aberration of magnification is represented with g-line light. The Y-axis in the spherical aberration's graph is entrance pupil radius, the Y-axis in the astigmatism's, distortion's and chromatic aberration of magnification's graphs is image height. "Fno" denotes an F number and "ω" denotes a semifield angle. "f" denotes a focal length.

According to numerical examples 1 through 5 and a numerical example 7 shown in FIG. 6, FIG. 8, FIG. 10, FIG. 12, FIG. 14, and FIG. 18, each lens unit moves in the following manner during zooming from the wide-angle end to the telephoto end.

The first lens unit L1a-e,g moves (A1-A5, A7) with a part of a locus convex toward the image side. The second lens unit L2a-e,g and the fourth lens unit L4a-e,g moves (B1-B5 and B7, D1-D5 and D7 respectively) toward the object side. The third lens unit L3a-e,g moves (C1-C5 and C7) with a part of a locus convex toward the image side or toward the object side. At this time, an interval between the first lens unit L1a-e,g and the second lens unit L2a-e,g is smaller at the telephoto end than at the wide-angle end. In addition, at this time, an interval between the second lens unit L2a-e, g and the third lens unit L3a-e,g is larger at the telephoto end than at the wide-angle end. An interval between the third lens unit L3a-e,g and the fourth lens unit L4a-e,g is smaller at the telephoto end than at the wide-angle end.

In a numeral example 6 shown in FIG. 16, the first lens unit L1f, the second lens unit L2f, the third lens unit L3f, and the fourth lens unit L4f are similar to those in the other numerical examples. A fifth lens unit L5 has a negative refractive power and a sixth lens unit L6 has a positive refractive power.

In the numerical example 6, the first lens unit L1f nonlinearly moves (A6) toward the image side during zooming from the wide-angle end to the telephoto end. The second lens unit L2f, the fourth lens unit L4f, and the fifth lens unit L5 move (B6, D6, and E respectively) toward the object side. The third lens unit L3f moves (C6) with a part of a locus convex toward the object side. The sixth lens unit L6 remains stationary. At this time, an interval between the first lens unit L1f and the second lens unit L2f is smaller, an interval between the second lens unit L2f and the third lens unit L3f is larger, an interval between the third lens unit L3f and the fourth lens unit L4f is smaller, and an interval between the fourth lens unit L4f and the fifth lens unit L5 is larger at the telephoto end than at the wide-angle end.

Specific numerical value data in the numerical examples 1 through 7 is set forth below. In each of the numerical examples 1 through 7, "i" stands for the order of a surface from the object side, "Ri" stands for a radius of curvature of the i-th optical surface (an i-th surface), "Di" stands for an on-axial interval between the i-th surface and the (i+1)th surface, "Ndi" and "vdi" respectively stand for a refractive index and an Abbe number of the i-th optical material (except for a lens (layer) made of a resin or a fine particle dispersion material) with respect to d-line light.

The refractive index and the Abbe number of a refractive optical element GIT made of a resin or a fine particle dispersion material with respect to d-line light are represented as "NGIT" and "vGIT", respectively.

In addition, "f" stands for the focal length, and "Fno" stands for the F number.

In addition, "x" denotes a displacement from a surface vertex along the optical axis in a position at a height "h" from the optical axis in a direction normal to the optical axis, "r" stands for a paraxial radius of curvature, "k" stands for a conic coefficient, and each of "B", "C", "D", and "E" stands for an aspheric coefficient. The aspheric shape is expressed as follows:

$$x(h) = \frac{(1/r)h^2}{1+\sqrt{\{1-(1+k)(h/r)^2\}}} + Bh^4 + Ch^6 + Dh^8 + Eh^{10}\ldots$$

In addition, "E±XX" stands for "×10$^{\pm XX}$".

In the numerical example 1, an ultraviolet (UV) curable resin 1 is used in a simple body as the refractive optical element GIT at the 6th, 9th, and 26th surfaces counting from the object side. In the numerical example 2, the ultraviolet (UV) curable resin 1 is used in a simple body as the refractive optical element GIT at the 9th and 25th surfaces counting from the object side. In the numerical example 3, the ultraviolet (UV) curable resin 1 is used in a simple body as the refractive optical element GIT at the 26th surface counting from the object side. Additionally, the UV curable resin 1 and a material prepared by dispersing ITO into a host polymer are used as the refractive optical element GIT at the 6th and 9th surfaces. The refractive index of a fine ITO particle dispersion material is computed by using the Drude equation described above. For a host polymer, C001 (a UV curable resin 2) is used. A volume fraction of ITO is 15%. In the numerical example 4, the ultraviolet (UV) curable resin 1 is used in a simple body as the refractive optical element GIT at the 10th, 23rd, and 27th surfaces counting from the object side. In the numerical example 5, the ultraviolet (UV) curable resin 1 is used in a simple body as the refractive optical element GIT at the 26th surface counting from the object side. Additionally, the UV curable resin 1 and a material prepared by dispersing ITO into a host polymer are used as the refractive optical element GIT at the 10th surface. In the numerical example 6, the ultraviolet (UV) curable resin 1 is used in a simple body as the refractive optical element GIT at the 6th, 9th, and 24th surfaces counting from the object side. In the numerical example 7, the ultraviolet (UV) curable resin 1 is used in a simple body as the refractive optical element GIT at the 6th and 9th surfaces counting from the object side. Additionally, the UV curable resin 1 and a material prepared by dispersing ITO into a host polymer are used as the refractive optical element GIT at the 25th surface.

In each numerical example, the refractive optical element GIT is located at a position in which a distance from the aperture stop on the optical axis varies between at the wide-angle end and at the telephoto end. Accordingly, variation in chromatic aberration of magnification occurring during zooming can be reduced, and a useful optical performance can be implemented in the entire zooming area. Furthermore, in the numerical example 4, the ultraviolet (UV) curable resin 1 is used in a simple body as the refractive optical element GIT in the first lens unit L1$d$, which has a relatively small amount of movement during zooming from the wide-angle end to the telephoto end. In the numerical example 5, the ultraviolet (UV) curable resin 1 and a material prepared by dispersing ITO into a host polymer are used as the refractive optical element GIT in the first lens unit L1$e$, which has a relatively small amount of movement during zooming from the wide-angle end to the telephoto end. In the numerical examples 4 and 5, the refractive optical element GIT is used not to decrease the variation of chromatic aberration of magnification during zooming rather to correct chromatic aberration of magnification occurring in the first lens unit L1$d,e$.

In Table 1, the refractive index, the Abbe number, and the relative partial dispersion with respect to d-line light, g-line light, C-line light, and F-line light in the case of using the UV curable resin 1, the UV curable resin 2, N-polyvinylcarbazole, and TiO$_2$ in a simple body are shown. In addition, in Table 2, the refractive index, the Abbe number, and the relative partial dispersion with respect to d-line light, g-line light, C-line light, and F-line light in the case of using ITO in a simple body and a mixture of fine ITO particles into the UV curable resin 2 in a volume fraction of 15% are shown.

In addition, in table 3, numerical values of the refractive optical element GIT, which is used to decrease the variation of chromatic aberration of magnification during zooming, in each of the numerical examples 1 through 7 with respect to each of the above conditional expressions are shown.

Numerical Example 1

| f = 29.53–67.53 mm Fno = 2.92 | | | |
|---|---|---|---|
| R1(Aspheric) = 78.667 | D1 = 3.00 | Nd1 = 1.71300 | vd1 = 53.8 |
| R2 = 29.839 | D2 = 19.69 | | |
| R3 = −138.741 | D3 = 2.30 | Nd2 = 1.77250 | vd2 = 49.6 |
| R4 = 60.388 | D4 = 0.27 | | |
| R5 = 54.526 | D5 = 5.31 | Nd3 = 1.84666 | vd3 = 23.9 |
| R6 = 3429.488 | D6 = 0.10 | NGIT = 1.63555 | vGIT = 22.7 |
| R7 = 189.473 | D7 = Variable | | |
| R8 = 60.935 | D8 = 2.19 | Nd4 = 1.77250 | vd4 = 49.6 |
| R9 = 121.460 | D9 = 1.18 | NGIT = 1.63555 | vGIT = 22.7 |
| R10 = 284.245 | D10 = 1.80 | Nd5 = 1.84666 | vd5 = 23.9 |
| R11 = 31.701 | D11 = 6.98 | Nd6 = 1.65160 | vd6 = 58.6 |
| R12 = −205.490 | D12 = 0.10 | | |
| R13 = 88.521 | D13 = 3.22 | Nd7 = 1.65160 | vd7 = 58.6 |
| R14 = −966.255 | D14 = 0.10 | | |
| R15 = 46.964 | D15 = 3.55 | Nd8 = 1.80400 | vd8 = 46.6 |
| R16 = 140.446 | D16 = Variable | | |
| R17 = SP | D17 = 1.50 | | |
| R18 = −181.718 | D18 = 3.32 | Nd9 = 1.76182 | vd9 = 26.5 |
| R19 = −31.930 | D19 = 1.30 | Nd10 = 1.80400 | vd10 = 46.6 |
| R20 = 59.174 | D20 = 1.59 | | |
| R21 = −283.045 | D21 = 1.74 | Nd11 = 1.80518 | vd11 = 25.4 |
| R22 = −63.468 | D22 = 1.30 | Nd12 = 1.51633 | vd12 = 64.1 |
| R23 = 82.036 | D23 = 1.50 | | |
| R24 = SSP | D24 = Variable | | |
| R25 = 904.515 | D25 = 5.61 | Nd13 = 1.49700 | vd13 = 81.5 |
| R26 = −21.771 | D26 = 1.03 | NGIT = 1.63555 | vGIT = 22.7 |
| R27 = −18.357 | D27 = 1.50 | Nd14 = 1.63980 | vd14 = 34.5 |
| R28 = −40.719 | D28 = 0.10 | | |
| R29 = 76.804 | D29 = 5.57 | Nd15 = 1.65160 | vd15 = 58.6 |
| R30 = −40.985 | D30 = 4.91 | | |
| R31 = −32.072 | D31 = 1.40 | Nd16 = 1.84666 | vd16 = 23.9 |
| R32 = −104.663 | D32 = Variable | | |

Aspheric Coefficients R1: k = 0.000000E+00 B = 1.162203E−06 C = 5.817211E−10 D = −4.459485E−13 E = 2.614658E−16

| | Focal Length | | |
|---|---|---|---|
| Variable Space | 29.53 | 50.05 | 67.53 |
| D7 | 40.08 | 11.04 | 1.19 |
| D16 | 4.24 | 12.84 | 18.61 |
| D24 | 15.91 | 7.22 | 1.36 |

Numerical Example 2

| f = 29.95–67.36 mm Fno = 2.92 | | | |
|---|---|---|---|
| R1(Aspheric) = 83.218 | D1 = 3.00 | Nd1 = 1.71300 | vd1 = 53.8 |
| R2 = 31.364 | D2 = 19.69 | | |
| R3 = −140.674 | D3 = 2.30 | Nd2 = 1.77250 | vd2 = 49.6 |
| R4 = 63.619 | D4 = 0.35 | | |
| R5 = 57.374 | D5 = 4.42 | Nd3 = 1.84666 | vd3 = 23.9 |
| R6 = 233.029 | D6 = Variable | | |
| R7 = 54.038 | D7 = 3.00 | Nd4 = 1.77250 | vd4 = 49.6 |
| R8 = 273.435 | D8 = 1.80 | Nd5 = 1.84666 | vd5 = 23.9 |
| R9 = 29.983 | D9 = 0.96 | NGIT = 1.63555 | vGIT = 22.7 |
| R10 = 35.129 | D10 = 6.30 | Nd6 = 1.65160 | vd6 = 58.6 |
| R11 = −139.899 | D11 = 0.10 | | |
| R12 = 104.499 | D12 = 2.96 | Nd7 = 1.65160 | vd7 = 58.6 |
| R13 = −486.562 | D13 = 0.10 | | |

-continued

| f = 29.95-67.36 mm Fno = 2.92 | | | |
|---|---|---|---|
| R14 = 44.214 | D14 = 3.34 | Nd8 = 1.83400 | vd8 = 37.2 |
| R15 = 82.353 | D15 = Variable | | |
| R16 = SP | D16 = 1.50 | | |
| R17 = −159.770 | D17 = 2.51 | Nd9 = 1.76182 | vd9 = 26.5 |
| R18 = −39.743 | D18 = 1.30 | Nd10 = 1.80400 | vd10 = 46.6 |
| R19 = 65.223 | D19 = 2.55 | | |
| R20 = −109.144 | D20 = 1.95 | Nd11 = 1.80518 | vd11 = 25.4 |
| R21 = −38.869 | D21 = 1.30 | Nd12 = 1.51633 | vd12 = 64.1 |
| R22 = 111.653 | D22 = 1.50 | | |
| R23 = SSP | D23 = Variable | | |
| R24 = −210.949 | D24 = 6.38 | Nd13 = 1.49700 | vd13 = 81.5 |
| R25 = −19.323 | D25 = 2.05 | NGIT = 1.63555 | vGIT = 22.7 |
| R26 = −16.570 | D26 = 1.50 | Nd14 = 1.63980 | vd14 = 34.5 |
| R27 = −36.447 | D27 = 0.11 | | |
| R28 = 66.332 | D28 = 6.76 | Nd15 = 1.65160 | vd15 = 58.6 |
| R29 = −38.903 | D29 = 3.05 | | |
| R30 = −32.918 | D30 = 1.40 | Nd16 = 1.84666 | vd16 = 23.9 |
| R31 = −119.141 | D31 = Variable | | |

Aspheric Coefficients R1: k = 0.000000E+00 B = 1.044863E−06 C = 4.398483E−10 D = −4.395901E−13 E = 2.614658E−16

| | Focal Length | | |
|---|---|---|---|
| Variable Space | 29.95 | 50.36 | 67.36 |
| D6 | 40.08 | 10.32 | 0.22 |
| D15 | 4.24 | 12.99 | 18.91 |
| D23 | 15.91 | 7.17 | 7.25 |

Numerical Example 3

| f = 29.15-67.98 mm Fno = 2.92 | | | |
|---|---|---|---|
| R1(Aspheric) = 83.153 | D1 = 3.00 | Nd1 = 1.71300 | vd1 = 53.8 |
| R2 = 29.965 | D2 = 19.69 | | |
| R3 = −128.925 | D3 = 2.30 | Nd2 = 1.80400 | vd2 = 46.6 |
| R4 = 58.609 | D4 = 0.15 | | |
| R5 = 54.340 | D5 = 4.88 | Nd3 = 1.80518 | vd3 = 25.4 |
| R6 = 613.319 | D6 = 0.30 | NGIT = 1.57857 | vGIT = 16.5 |
| R7 = 2522.073 | D7 = Variable | | |
| R8 = 73.852 | D8 = 3.93 | Nd4 = 1.83400 | vd4 = 37.2 |
| R9 = −150.873 | D9 = 0.07 | NGIT = 1.57857 | vGIT = 16.5 |
| R10 = −250.186 | D10 = 1.80 | Nd5 = 1.76182 | vd5 = 26.5 |
| R11 = 28.734 | D11 = 7.22 | Nd6 = 1.67790 | vd6 = 55.3 |
| R12 = −269.138 | D12 = 0.10 | | |
| R13 = 68.562 | D13 = 2.96 | Nd7 = 1.67790 | vd7 = 55.3 |
| R14 = 395.522 | D14 = 0.10 | | |
| R15 = 45.662 | D15 = 2.78 | Nd8 = 1.80400 | vd8 = 46.6 |
| R16 = 87.034 | D16 = Variable | | |
| R17 = SP | D17 = 1.50 | | |
| R18 = −152.844 | D18 = 3.03 | Nd9 = 1.76182 | vd9 = 26.5 |
| R19 = −31.732 | D19 = 1.30 | Nd10 = 1.80400 | vd10 = 46.6 |
| R20 = 60.093 | D20 = 1.53 | | |
| R21 = −309.490 | D21 = 1.60 | Nd11 = 1.80518 | vd11 = 25.4 |
| R22 = −61.844 | D22 = 1.30 | Nd12 = 1.51633 | vd12 = 64.1 |
| R23 = 67.278 | D23 = 1.50 | | |
| R24 = SSP | D24 = Variable | | |
| R25 = 94.867 | D25 = 6.57 | Nd13 = 1.49700 | vd13 = 81.5 |
| R26 = −22.500 | D26 = 1.34 | NGIT = 1.63555 | vGIT = 22.7 |
| R27 = −18.377 | D27 = 1.50 | Nd14 = 1.63980 | vd14 = 34.5 |
| R28 = −44.480 | D28 = 0.10 | | |
| R29 = 102.402 | D29 = 5.28 | Nd15 = 1.65160 | vd15 = 58.6 |
| R30 = −40.467 | D30 = 4.96 | | |
| R31 = −31.435 | D31 = 1.40 | Nd16 = 1.84666 | vd16 = 23.9 |
| R32 = −94.633 | D32 = Variable | | |

Aspheric Coefficients R1: k = 0.000000E+00 B = 1.405635E−06 C = 3.548590E−10 D = −3.207345E−13 E = 2.614658E−16

| | Focal Length | | |
|---|---|---|---|
| Variable Space | 29.15 | 49.98 | 67.98 |
| D7 | 40.08 | 10.93 | 1.17 |
| D16 | 4.24 | 12.85 | 18.64 |
| D24 | 15.91 | 7.22 | 1.36 |

Numerical Example 4

| f = 16.49-33.85 mm Fno = 2.90 | | | |
|---|---|---|---|
| R1(Aspheric) = 507.761 | D1 = 2.00 | Nd1 = 1.77250 | vd1 = 49.6 |
| R2 = 21.366 | D2 = 17.00 | | |
| R3 = −63.872 | D3 = 1.20 | Nd2 = 1.83481 | vd2 = 42.7 |
| R4 = 40.347 | D4 = 0.80 | Nd3 = 1.52420 | vd3 = 51.4 |
| R5(Aspheric) = 69.958 | D5 = 0.15 | | |
| R6 = 40.092 | D6 = 4.61 | Nd4 = 1.84666 | vd4 = 23.9 |
| R7 = −361.958 | D7 = 0.05 | NGIT = 1.63555 | vGIT = 22.7 |
| R8 = 286.748 | D8 = Variable | | |
| R9 = 45.760 | D9 = 1.30 | Nd5 = 1.80518 | vd5 = 25.4 |
| R10 = 20.818 | D10 = 0.68 | NGIT = 1.63555 | vGIT = 22.7 |
| R11 = 24.730 | D11 = 6.53 | Nd6 = 1.51742 | vd6 = 52.4 |
| R12 = −122.360 | D12 = 0.15 | | |
| R13 = 39.617 | D13 = 4.38 | Nd7 = 1.69680 | vd7 = 55.5 |
| R14 = −88.765 | D14 = Variable | | |
| R15 = SP | D15 = 1.56 | | |
| R16 = 1448.935 | D16 = 1.52 | Nd8 = 1.88300 | vd8 = 40.8 |
| R17 = 56.406 | D17 = 3.1 | | |
| R18 = −30.519 | D18 = 1.00 | Nd9 = 1.61772 | vd9 = 49.8 |
| R19 = 29.673 | D19 = 5.45 | Nd10 = 1.80518 | vd10 = 25.4 |
| R20 = −112.986 | D20 = 0.94 | | |
| R21 = SSP | D21 = Variable | | |
| R22 = 31.701 | D22 = 7.50 | Nd11 = 1.49700 | vd11 = 81.5 |
| R23 = −26.292 | D23 = 0.35 | NGIT = 1.63555 | vGIT = 22.7 |
| R24 = −24.131 | D24 = 1.30 | Nd12 = 1.84666 | vd12 = 23.9 |
| R25 = −38.555 | D25 = 0.20 | | |
| R26 = −195.910 | D26 = 1.20 | Nd13 = 1.84666 | vd13 = 23.9 |
| R27 = 26.299 | D27 = 2.32 | NGIT = 1.63555 | vGIT = 22.7 |
| R28 = 67.188 | D28 = 4.58 | Nd14 = 1.49700 | vd14 = 81.5 |
| R29 = −69.724 | D29 = 0.15 | | |
| R30 = 203.512 | D30 = 2.93 | Nd15 = 1.73077 | vd15 = 40.5 |
| R31(Aspheric) = −152.759 | D31 = Variable | | |

Aspheric Coefficients
R1: k = 0.000000E+00 B = 1.605396E−05 C = −2.338620E−08 D = 3.320901E−11 E = −2.768947E−14 F = 1.104155E−17
R5: k = 0.000000E+00 B = 1.303892E−05 C = 1.743690E−08 D = −3.194887E−10 E = 1.429162E−12 F = −2.219288E−15
R31: k = 0.000000E+00 B = 1.005457E−05 C = 6.167914E−09 D = 8.238111E−11 E = −3.521872E−13 F = 6.609186E−16

| | Focal Length | | |
|---|---|---|---|
| Variable Space | 16.49 | 23.96 | 33.85 |
| D8 | 21.26 | 8.52 | 1.15 |
| D14 | 0.73 | 5.54 | 10.99 |
| D21 | 10.29 | 5.51 | 0.11 |

Numerical Example 5

| f = 16.52-33.85 mm Fno = 2.91 | | | |
|---|---|---|---|
| R1(Aspheric) = 393.210 | D1 = 2.00 | Nd1 = 1.77250 | vd1 = 49.6 |
| R2 = 21.676 | D2 = 17.13 | | |
| R3 = −59.666 | D3 = 1.20 | Nd2 = 1.83481 | vd2 = 42.7 |
| R4 = 89.483 | D4 = 0.17 | Nd3 = 1.49171 | vd3 = 57.4 |
| R5(Aspheric) = 115.187 | D5 = 0.11 | | |
| R6 = 41.706 | D6 = 2.99 | Nd4 = 1.80518 | vd4 = 25.4 |
| R7 = 77.594 | D7 = 1.34 | NGIT = 1.57857 | vGIT = 16.5 |
| R8 = 367.240 | D8 = Variable | | |
| R9 = 62.125 | D9 = 1.30 | Nd5 = 1.80518 | vd5 = 25.4 |
| R10 = 24.979 | D10 = 0.15 | NGIT = 1.57857 | vGIT = 16.5 |
| R11 = 21.363 | D11 = 6.25 | Nd6 = 1.51742 | vd6 = 52.4 |
| R12 = −140.167 | D12 = 0.56 | | |
| R13 = 46.758 | D13 = 4.24 | Nd7 = 1.83400 | vd7 = 37.2 |
| R14 = −89.820 | D14 = Variable | | |
| R15 = SP | D15 = 1.56 | | |
| R16 = −205.783 | D16 = 1.45 | Nd8 = 1.88300 | vd8 = 40.8 |
| R17 = 99.257 | D17 = 2.44 | | |
| R18 = −31.931 | D18 = 1.05 | Nd9 = 1.72342 | vd9 = 38.0 |
| R19 = 24.574 | D19 = 5.66 | Nd10 = 1.84666 | vd10 = 23.9 |
| R20 = −77.621 | D20 = 0.75 | | |
| R21 = SSP | D21 = Variable | | |
| R22 = 35.993 | D22 = 7.27 | Nd11 = 1.49700 | vd11 = 81.5 |
| R23 = −27.555 | D23 = 1.20 | Nd12 = 1.84666 | vd12 = 23.9 |
| R24 = −45.652 | D24 = 1.46 | | |
| R25 = 5474.195 | D25 = 1.20 | Nd13 = 1.80518 | vd13 = 25.4 |
| R26 = 23.656 | D26 = 1.58 | NGIT = 1.63555 | vGIT = 22.7 |
| R27 = 35.338 | D27 = 5.43 | Nd14 = 1.49700 | vd14 = 81.5 |
| R28 = −81.068 | D28 = 0.14 | | |
| R29 = 1338.496 | D29 = 2.98 | Nd15 = 1.73077 | vd15 = 40.5 |
| R30(Aspheric) = −79.256 | D30 = Variable | | |

Aspheric Coefficients
R1: k = 0.000000E+00 B = 1.578154E−05 C = −2.218512E−08 D = 3.150156E−11 E = −2.609470E−14 F = 1.068160E−17
R5: k = 0.000000E+00 B = 1.494668E−05 C = 8.387905E−09 D = −2.422512E−10 E = 1.157953E−12 F = −1.859744E−15
R30: k = 0.000000E+00 B = 7.541401E−06 C = 9.166156E−09 D = 8.427572E−12 E = 1.979376E−14 F = −1.226686E−16

| | Focal Length | | |
|---|---|---|---|
| Variable Space | 16.52 | 24.01 | 33.85 |
| D8 | 21.32 | 7.92 | 0.10 |
| D14 | 0.84 | 5.72 | 11.14 |
| D21 | 10.50 | 5.63 | 0.20 |

Numerical Example 6

| f = 24.7-67.93 mm Fno = 2.90 | | | |
|---|---|---|---|
| R1(Aspheric) = 156.470 | D1 = 2.50 | Nd1 = 1.77250 | vd1 = 49.6 |
| R2 = 32.247 | D2 = 12.80 | | |
| R3 = −161.986 | D3 = 2.30 | Nd2 = 1.77250 | vd2 = 49.6 |
| R4 = 76.327 | D4 = 0.15 | | |
| R5 = 59.745 | D5 = 5.34 | Nd3 = 1.80518 | vd3 = 25.4 |
| R6 = 617.141 | D6 = 0.05 | NGIT = 1.63555 | vGIT = 22.7 |
| R7 = 124.489 | D7 = Variable | | |
| R8 = 112.883 | D8 = 1.90 | Nd4 = 1.84666 | vd4 = 23.8 |
| R9 = 42.285 | D9 = 0.40 | NGIT = 1.63555 | vGIT = 22.7 |
| R10 = 45.751 | D10 = 7.12 | Nd5 = 1.69680 | vd5 = 55.5 |
| R11 = −232.805 | D11 = 0.15 | | |

-continued

| f = 24.7-67.93 mm Fno = 2.90 | | | |
|---|---|---|---|
| R12 = 96.132 | D12 = 4.10 | Nd6 = 1.83481 | vd6 = 42.7 |
| R13 = −208.360 | D13 = 0.15 | | |
| R14 = 45.444 | D14 = 4.80 | Nd7 = 1.69680 | vd7 = 55.5 |
| R15 = 315.488 | D15 = Variable | | |
| R16 = SSP | D16 = 2.14 | | |
| R17 = −149.853 | D17 = 1.30 | Nd8 = 1.88300 | vd8 = 40.8 |
| R18 = 44.886 | D18 = 2.57 | | |
| R19 = −95.462 | D19 = 1.61 | Nd9 = 1.77250 | vd9 = 49.6 |
| R20 = 33.258 | D20 = 4.35 | Nd10 = 1.80518 | vd10 = 25.4 |
| R21 = −138.805 | D21 = 1.03 | | |
| R22 = SP | D22 = Variable | | |
| R23 = 107.997 | D23 = 1.30 | Nd11 = 1.84666 | vd11 = 23.9 |
| R24 = 26.373 | D24 = 0.40 | NGIT = 1.63555 | vGIT = 22.7 |
| R25 = 29.562 | D25 = 6.86 | Nd12 = 1.49700 | vd12 = 81.5 |
| R26 = −40.688 | D26 = 0.15 | | |
| R27 = 31.737 | D27 = 4.70 | Nd13 = 1.62041 | vd13 = 60.3 |
| R28 = −141.997 | D28 = Variable | | |
| R29 = −97.458 | D29 = 2.28 | Nd14 = 1.88300 | vd14 = 40.8 |
| R30 = −41.285 | D30 = 0.15 | | |
| R31 = −45.587 | D31 = 1.20 | Nd15 = 1.77250 | vd15 = 49.6 |
| R32 = 28.517 | D32 = Variable | | |
| R33 = 85.150 | D33 = 7.49 | Nd16 = 1.58313 | vd16 = 59.4 |
| R34(Aspheric) = −72.968 | | | |

Aspheric Coefficients
R1: k = 0.000000E+00 B = 1.130764E−06 C = 1.64732E−09 D = −2.876727E−12 E = 2.932503E−15 F = −1.101809E−18
R34: k = 0.000000E+00 B = 5.470468E−07 C = −1.854028E−08 D = 1.108805E−10 E = −3.226632E−13 F = 3.579467E−16

| | Focal Length | | |
|---|---|---|---|
| Variable Space | 24.7 | 35.74 | 67.93 |
| D7 | 54.25 | 27.95 | 1.49 |
| D15 | 3.09 | 6.16 | 18.81 |
| D22 | 17.36 | 14.30 | 1.65 |
| D28 | 1.20 | 3.65 | 8.94 |
| D32 | 4.55 | 12.12 | 16.56 |

Numerical Example 7

| f = 29.12-67.69 mm Fno = 2.92 | | | |
|---|---|---|---|
| R1(Aspheric) = 90.006 | D1 = 3.00 | Nd1 = 1.71300 | vd1 = 53.8 |
| R2 = 31.071 | D2 = 19.69 | | |
| R3 = −184.371 | D3 = 2.30 | Nd2 = 1.77250 | vd2 = 49.6 |
| R4 = 58.633 | D4 = 0.35 | | |
| R5 = 53.599 | D5 = 4.88 | Nd3 = 1.84666 | vd3 = 23.9 |
| R6 = 324.688 | D6 = 0.10 | NGIT = 1.63555 | vGIT = 22.7 |
| R7 = 166.412 | D7 = Variable | | |
| R8 = 62.052 | D8 = 2.28 | Nd4 = 1.77250 | vd4 = 49.6 |
| R9 = 136.753 | D9 = 1.19 | NGIT = 1.63555 | vGIT = 22.7 |
| R10 = 409.348 | D10 = 1.80 | Nd5 = 1.84666 | vd5 = 23.9 |
| R11 = 33.323 | D11 = 6.95 | Nd6 = 1.65160 | vd6 = 58.6 |
| R12 = −164.631 | D12 = 0.10 | | |
| R13 = 88.043 | D13 = 3.26 | Nd7 = 1.65160 | vd7 = 58.6 |
| R14 = −1103.173 | D14 = 0.10 | | |
| R15 = 45.096 | D15 = 3.37 | Nd8 = 1.80400 | vd8 = 46.6 |
| R16 = 110.915 | D16 = Variable | | |
| R17 = SSP | D17 = 1.50 | | |
| R18 = −559.117 | D18 = 4.17 | Nd9 = 1.76182 | vd9 = 26.5 |
| R19 = −27.260 | D19 = 1.30 | Nd10 = 1.80400 | vd10 = 46.6 |
| R20 = 59.272 | D20 = 1.74 | | |
| R21 = −170.180 | D21 = 1.59 | Nd11 = 1.80518 | vd11 = 25.4 |
| R22 = −79.296 | D22 = 1.30 | Nd12 = 1.51633 | vd12 = 64.1 |
| R23 = 65.725 | D23 = Variable | | |
| R24 = −511.125 | D24 = 5.17 | Nd13 = 1.49700 | vd13 = 81.5 |
| R25 = −25.545 | D25 = 0.21 | NGIT = 1.57857 | vGIT = 16.5 |
| R26 = −28.199 | D26 = 1.50 | Nd14 = 1.63980 | vd14 = 34.5 |

-continued f = 29.12-67.69 mm Fno = 2.92

| | | | |
|---|---|---|---|
| R27 = −42.797 | D27 = 0.10 | | |
| R28 = 73.558 | D28 = 6.36 | Nd15 = 1.65160 | νd15 = 58.6 |
| R29 = −42.358 | D29 = 4.90 | | |
| R30 = −31.987 | D30 = 1.40 | Nd16 = 1.84666 | νd16 = 23.9 |
| R31 = −72.775 | | | |

Aspheric Coefficients
R1: k = 0 B = 1.147676E−06 C = 4.675568E−10 D = −4.671608E−13 E = 2.614658E−16

| Variable Space | 29.12 | 49.84 | 67.69 |
|---|---|---|---|
| D7 | 40.08 | 10.95 | 1.20 |
| D16 | 4.24 | 12.98 | 18.89 |
| D23 | 17.41 | 8.72 | 2.86 |

TABLE 1

| | UV Curable Resin 1 | UV Curable Resin 2 | N-polyvinylcarbazole | $TiO_2$ |
|---|---|---|---|---|
| d-line Refractive Index | 1.63555 | 1.52415 | 1.69591 | 2.30377 |
| g-line Refractive Index | 1.67532 | 1.53706 | 1.75164 | 2.45676 |
| C-line Refractive Index | 1.62807 | 1.52116 | 1.68528 | 2.28032 |
| F-line Refractive Index | 1.65604 | 1.53133 | 1.72465 | 2.37452 |
| νd | 22.7 | 51.6 | 17.7 | 13.8 |
| θgd | 1.422 | 1.269 | 1.415 | 1.624 |
| θgF | 0.689 | 0.563 | 0.686 | 0.873 |

TABLE 2

| | ITO | ITO Mixture (15%-ITO) |
|---|---|---|
| d-line Refractive Index | 1.85710 | 1.57857 |
| g-line Refractive Index | 1.99250 | 1.61359 |
| C-line Refractive Index | 1.79800 | 1.56580 |
| F-line Refractive Index | 1.94870 | 1.60090 |
| νd | 5.7 | 16.5 |
| θgd | 0.898 | 0.998 |
| θgF | 0.291 | 0.362 |

TABLE 3

Numerical Example 1

| Conditional Expression | Lens Surface | | |
|---|---|---|---|
| | 6th | 9th | 26th |
| (2) dt/dw | 0.600 | 1.718 | 0.569 |
| (3) dw/dt | 1.667 | 0.582 | 1.757 |
| (1), (5) νd | 22.7 | 22.7 | 22.7 |
| (1), (6) θgF | 0.689 | 0.689 | 0.689 |
| (4) θgd | 1.422 | 1.422 | 1.422 |
| (9) |dn/dT| | −1.7055 × 10⁻⁴ | −1.7055 × 10⁻⁴ | −1.7055 × 10⁻⁴ |

TABLE 3-continued

Numerical Example 2

| Conditional Expression | Lens Surface | |
|---|---|---|
| | 9th | 25th |
| (2) dt/dw | 1.860 | 0.580 |
| (3) dw/dt | 0.538 | 1.724 |
| (1), (5) νd | 22.7 | 22.7 |
| (1), (6) θgF | 0.689 | 0.689 |
| (4) θgd | 1.422 | 1.422 |
| (9) |dn/dT| | −1.7055 × 10⁻⁴ | −1.7055 × 10⁻⁴ |

Numerical Example 3

| Conditional Expression | Lens Surface | | |
|---|---|---|---|
| | 6th | 9th | 26th |
| (2) dt/dw | 0.613 | 1.750 | 0.575 |
| (3) dw/dt | 1.632 | 0.572 | 1.739 |
| (1), (5) νd | 16.5 | 16.5 | 22.7 |
| (1), (6) θgF | 0.362 | 0.362 | 0.689 |
| (4) θgd | 0.998 | 0.998 | 1.422 |
| (9) |dn/dT| | — | — | −1.7055 × 10⁻⁴ |

Numerical Example 4

| Conditional Expression | Lens Surface | | |
|---|---|---|---|
| | 10th | 23rd | 27th |
| (2) dt/dw | 1.872 | 0.659 | 0.705 |
| (3) dw/dt | 0.534 | 1.516 | 1.419 |
| (1), (5) νd | 22.7 | 22.7 | 22.7 |
| (1), (6) θgF | 0.689 | 0.689 | 0.689 |
| (4) θgd | 1.422 | 1.422 | 1.422 |
| (9) |dn/dT| | −1.7055 × 10⁻⁴ | −1.7055 × 10⁻⁴ | −1.7055 × 10⁻⁴ |

Numerical Example 5

| Conditional Expression | Lens Surface | |
|---|---|---|
| | 10th | 26th |
| (2) dt/dw | 1.867 | 0.702 |
| (3) dw/dt | 0.536 | 1.425 |
| (1), (5) νd | 16.5 | 22.7 |
| (1), (6) θgF | 0.362 | 0.689 |
| (4) θgd | 0.998 | 1.422 |
| (9) |dn/dT| | — | −1.7055 × 10⁻⁴ |

Numerical Example 6

| Conditional Expression | Lens Surface | | |
|---|---|---|---|
| | 6th | 9th | 24th |
| (2) dt/dw | 0.584 | 1.485 | 0.158 |
| (3) dw/dt | 1.713 | 0.673 | 6.336 |
| (1), (5) νd | 22.7 | 22.7 | 22.7 |
| (1), (6) θgF | 0.689 | 0.689 | 0.689 |
| (4) θgd | 1.422 | 1.422 | 1.422 |
| (9) |dn/dT| | −1.7055 × 10⁻⁴ | −1.7055 × 10⁻⁴ | −1.7055 × 10⁻⁴ |

Numerical Example 7

| Conditional Expression | Lens Surface | | |
|---|---|---|---|
| | 6th | 9th | 25th |
| (2) dt/dw | 0.618 | 1.739 | 0.574 |
| (3) dw/dt | 1.619 | 0.575 | 1.742 |
| (1), (5) νd | 22.7 | 22.7 | 16.5 |
| (1), (6) θgF | 0.689 | 0.689 | 0.362 |
| (4) θgd | 1.422 | 1.422 | 0.998 |
| (9) |dn/dT| | −1.7055 × 10⁻⁴ | −1.7055 × 10⁻⁴ | — |

Now, an exemplary embodiment of an image pickup apparatus that uses a zoom lens according to each of the numerical examples 1 through 7 is described.

Figure 21:
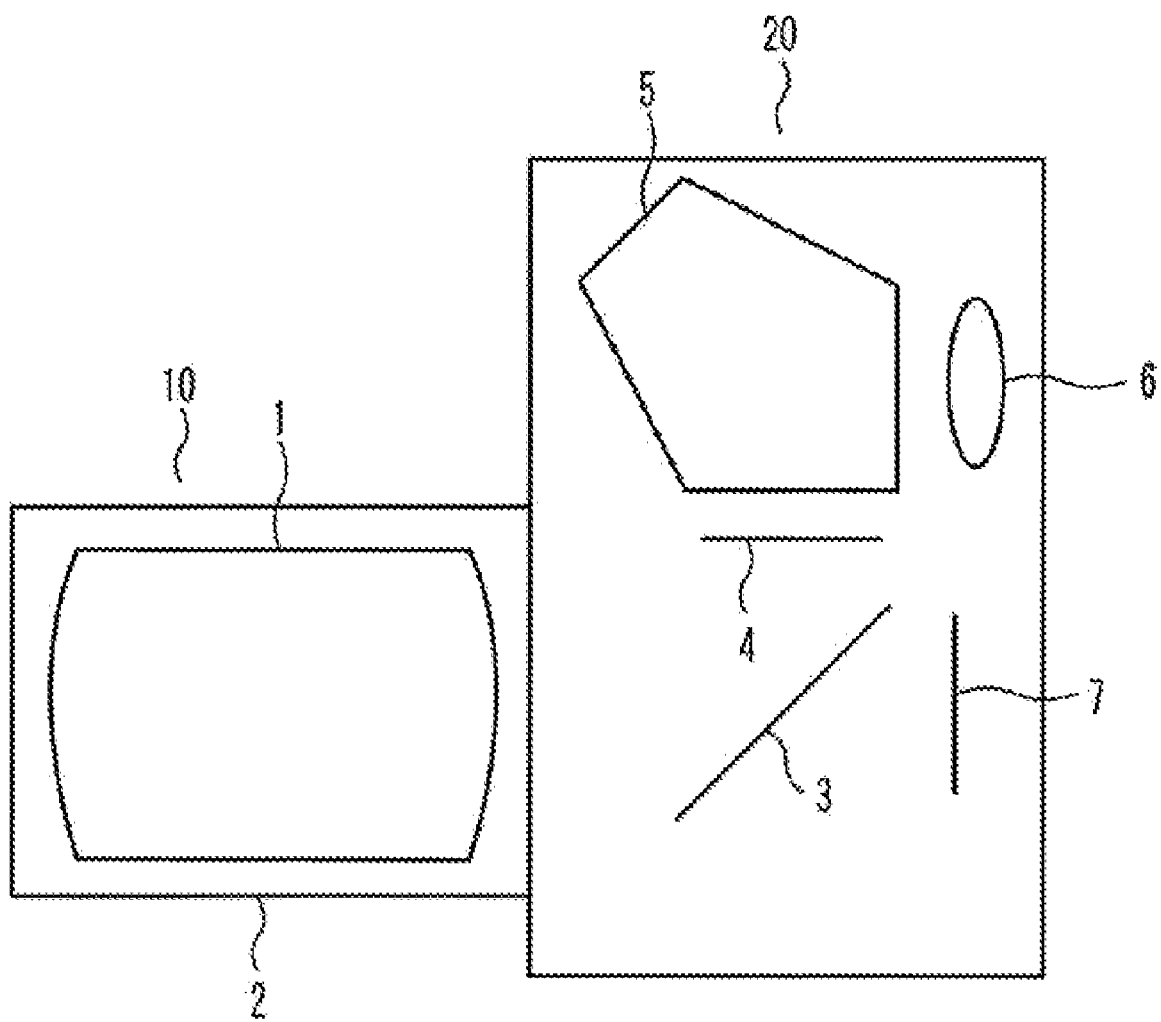
FIG. 21 is a diagram illustrating components of an image pickup apparatus according to an exemplary embodiment of the present invention.

FIG. 21 schematically illustrates components of a single-lens reflex camera. Referring to FIG. 21, a photographic lens 10 includes a zoom lens 1 according to each of the numerical examples 1 through 7. The zoom lens 1 is supported by a lens barrel 2 serving as a supporting member. In addition, the single-lens reflex camera includes a camera body 20. The camera body 20 includes a quick return mirror 3, a focusing screen 4, a pentagonal prism 5, and an eyepiece lens 6. The quick return mirror 3 is configured to reflect a light flux from the photographic lens 10 upward. The focusing screen 4 is located at a position in which the photographic lens 10 forms an image. The pentagonal prism 5 is adapted to convert a reverse image formed on the focusing screen 4 into an erect image. The eyepiece lens 6 is a lens through with an observer observes the erect image. A solid-state image sensor (photoelectric conversion element), such as a CCD sensor or a complementary metal-oxide semiconductor (CMOS) sensor, and a silver-halide film are located on a photosensitive surface 7. At the time of shooting, the quick return mirror 3 retracts from the optical path, and then an image is formed on the photosensitive surface 7 by the photographic lens 10.

Applying a zoom lens according to each of the numerical examples 1 through 7 to an optical apparatus such as an image pickup apparatus facilitates implementing an optical apparatus having a useful optical performance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2006-052801 filed Feb. 28, 2006 and No. 2007-005579 filed Jan. 15, 2007, which are hereby incorporated by reference herein in their entirety.

What is claimed is:

1. A zoom lens comprising:

a plurality of lens units, in which an interval between respective adjacent lens units varies during zooming;

an aperture stop; and a refractive optical element made of a solid material having an Abbe number (vd) and a relative partial dispersion ($\theta gF$) satisfying the following condition:

$\theta gF - (-1.665 \times 10^{-7} \cdot vd^3 + 5.213 \times 10^{-5} \cdot vd^2 - 5.656 \times 10^{-3} \cdot vd + 0.755) > 0$, wherein the refractive optical element is located at a position in which distances (dw, dt) from the aperture stop to the refractive optical element on an optical axis at a wide-angle end and a telephoto end, respectively, satisfy the following condition:

$dt/dw > 1.1$, wherein the refractive optical element has a negative refractive power and is located behind the aperture stop.

2. The zoom lens according to claim 1, wherein the Abbe number (vd) and a relative partial dispersion ($\theta gd$) of the solid material satisfy the following condition:

$\theta gd - (-1.687 \times 10^{-7} \cdot vd^3 + 5.702 \times 10^{-5} \cdot vd^2 - 6.603 \times 10^{-3} \cdot vd + 1.500) > 0$.

3. The zoom lens according to claim 1, wherein the Abbe number (vd) of the solid material satisfies the following condition:

$vd < 60$.

4. The zoom lens according to claim 1, wherein an absolute value ($|dn/dT|$) of a rate of change of refractive index for d-line light of the solid material with respect to temperature change in a range of 0° to 40° C. satisfies the following condition:

$|dn/dT| < 2.5 \times 10^{-4} (1/° C.)$.

5. The zoom lens according to claim 1, wherein the zoom lens is adapted to form an image on a photoelectric conversion element.

6. An optical apparatus comprising:

the zoom lens according to claim 1; and a photoelectric conversion element configured to receive an image formed by the zoom lens.

7. A zoom lens comprising:

a plurality of lens units, in which an interval between respective adjacent lens units varies during zooming;

an aperture stop; and a refractive optical element made of a solid material having an Abbe number (vd) and a relative partial dispersion ($\theta gF$) satisfying the following condition:

$\theta gF - (-1.665 \times 10^{-7} \cdot vd^3 + 5.213 \times 10^{-5} \cdot vd^2 - 5.656 \times 10^{-3} \cdot vd + 0.755) > 0$, wherein the refractive optical element is located at a position in which distances (dw, dt) from the aperture stop to the refractive optical element on an optical axis at a wide-angle end and a telephoto end, respectively, satisfy the following condition:

$dw/dt > 1.1$, wherein the refractive optical element has a negative refractive power and is located in front of the aperture stop.

8. The zoom lens according to claim 7, wherein the Abbe number (vd) and a relative partial dispersion ($\theta gd$) of the solid material satisfy the following condition:

$\theta gd - (-1.687 \times 10^{-7} \cdot vd^3 + 5.702 \times 10^{-5} \cdot vd^2 - 6.603 \times 10^{-3} \cdot vd + 1.500) > 0$.

9. The zoom lens according to claim 7, wherein the Abbe number (vd) of the solid material satisfies the following condition:

$vd < 60$.

10. The zoom lens according to claim 7, wherein an absolute value ($|dn/dT|$) of a rate of change of refractive index for d-line light of the solid material with respect to temperature change in a range of 0° to 40° C. satisfies the following condition:

$|dn/dT| < 2.5 \times 10^{-4} (1/° C.)$.

11. The zoom lens according to claim 7, wherein the zoom lens is adapted to form an image on a photoelectric conversion element.

12. An optical apparatus comprising:

the zoom lens according to claim 7; and a photoelectric conversion element configured to receive an image formed by the zoom lens.

13. A zoom lens comprising:

a lens unit having a negative refractive power;

a lens unit having a positive refractive power located behind the lens unit having a negative refractive power, in which zooming is performed by moving at least one of the two lens units along an optical axis;

an aperture stop; and a refractive optical element made of a solid material having an Abbe number (vd) and a relative partial dispersion (θgF) satisfying the following condition:

$$\theta gF-(-1.665\times10^{-7}\cdot vd^3+5.213\times10^{-5}\cdot vd^2-5.656\times10^{-3}\cdot vd+0.700)<0,$$

wherein the refractive optical element is located at a position in which distances (dw, dt) from the aperture stop to the refractive optical element on the optical axis at a wide-angle end and a telephoto end, respectively, satisfy the following condition:

$$dt/dw>1.1,$$

wherein the refractive optical element has a negative refractive power and is located in front of the aperture stop.

14. The zoom lens according to claim 13, wherein the zoom lens is adapted to form an image on a photoelectric conversion element.

15. An optical apparatus comprising:
the zoom lens according to claim 13; and
a photoelectric conversion element configured to receive an image formed by the zoom lens.

16. A zoom lens comprising:
a lens unit having a negative refractive power;
a lens unit having a positive refractive power located behind the lens unit having a negative refractive power, in which zooming is performed by moving at least one of the two lens units along an optical axis;
an aperture stop; and
a refractive optical element made of a solid material having an Abbe number (vd) and a relative partial dispersion (θgF) satisfying the following condition:

$$\theta gF-(-1.665\times10^{-7}\cdot vd^3+5.213\times10^{-5}\cdot vd^2-5.656\times10^{-3}\cdot vd+0.700)<0,$$

wherein the refractive optical element is located at a position in which distances (dw, dt) from the aperture stop to the refractive optical element on the optical axis at a wide-angle end and a telephoto end, respectively, satisfy the following condition:

$$dw/dt>1.1,$$

wherein the refractive optical element has a negative refractive power and is located behind the aperture stop.

17. The zoom lens according to claim 16, wherein an absolute value (|dn/dT|) of a rate of change of refractive index for d-line light of the solid material with respect to temperature change in a range of 0° to 40° C. satisfies the following condition:

$$|dn/dT|<2.5\times10^{-4}(1/°\text{C.}).$$

18. The zoom lens according to claim 16, wherein the zoom lens is adapted to form an image on a photoelectric conversion element.

19. An optical apparatus comprising:
the zoom lens according to claim 16; and
a photoelectric conversion element configured to receive an image formed by the zoom lens.

20. A zoom lens comprising:
a plurality of lens units, in which an interval between respective adjacent lens units varies during zooming;
an aperture stop; and
a refractive optical element made of a solid material having an Abbe number (vd) and a relative partial dispersion (θgF) satisfying the following condition:

$$\theta gF-(-1.665\times10^{-7}\cdot vd^3+5.213\times10^{-5}\cdot vd^2-5.656\times10^{-3}\cdot vd+0.755)>0,$$

wherein the refractive optical element is located at a position in which distances (dw, dt) from the aperture stop to the refractive optical element on an optical axis at a wide-angle end and a telephoto end, respectively, satisfy the following condition:

$$dt/dw>1.1,$$

wherein the Abbe number (vd) and a relative partial dispersion (θgd) of the solid material satisfy the following condition:

$$\theta gd-(-1.687\times10^{-7}\cdot vd^3+5.702\times10^{-5}\cdot vd^2-6.603\times10^{-3}\cdot vd+1.500)>0.$$

21. A zoom lens comprising:
a plurality of lens units, in which an interval between respective adjacent lens units varies during zooming;
an aperture stop; and
a refractive optical element made of a solid material having an Abbe number (vd) and a relative partial dispersion (θgF) satisfying the following condition:

$$\theta gF-(-1.665\times10^{-7}\cdot vd^3+5.213\times10^{-5}\cdot vd^2-5.656\times10^{-3}\cdot vd+0.755)>0,$$

wherein the refractive optical element is located at a position in which distances (dw, dt) from the aperture stop to the refractive optical element on an optical axis at a wide-angle end and a telephoto end, respectively, satisfy the following condition:

$$dw/dt>1.1,$$

wherein the Abbe number (vd) and a relative partial dispersion (θgd) of the solid material satisfy the following condition:

$$\theta gd-(-1.687\times10^{-7}\cdot vd^3+5.702\times10^{-5}\cdot vd^2-6.603\times10^{-3}\cdot vd+1.500)>0.$$

* * * * *